(12) United States Patent
Kubo

(10) Patent No.: US 6,211,914 B1
(45) Date of Patent: Apr. 3, 2001

(54) APPARATUS FOR READING SIGNALS OUT OF SOLID-STATE IMAGE SENSING DEVICE

(75) Inventor: Naoki Kubo, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/229,756

(22) Filed: Jan. 14, 1999

Related U.S. Application Data

(62) Division of application No. 08/757,946, filed on Nov. 27, 1996, now Pat. No. 5,912,703.

(30) Foreign Application Priority Data

Nov. 30, 1995 (JP) ...................................................... 7-334228
Dec. 4, 1995 (JP) ...................................................... 7-337683

(51) Int. Cl.[7] .................................................. H04N 5/217
(52) U.S. Cl. .......................................... 348/241; 348/249
(58) Field of Search .................................. 348/241, 242, 348/248, 249, 250, 311; 358/463; 327/103, 562, 563; 250/208.1

(56) References Cited

U.S. PATENT DOCUMENTS

| | | | |
|---|---|---|---|
| 4,288,707 | 9/1981 | Katakura | 327/103 |
| 4,333,111 | 6/1982 | Noda et al. | 348/241 |
| 4,719,512 | 1/1988 | Endo et al. | 348/250 |
| 4,809,074 | 2/1989 | Imaide et al. | 348/241 |
| 4,875,098 | 10/1989 | Yamamoto et al. | 348/250 |
| 5,031,036 | 7/1991 | Kikuchi et al. | 348/71 |
| 5,216,509 | 6/1993 | Hirasawa | 348/241 |
| 5,349,380 | 9/1994 | Stein | 348/241 |
| 5,473,660 | 12/1995 | Bastiaens et al. | 348/241 |
| 5,475,427 | 12/1995 | Horowitz | 348/241 |
| 5,572,155 | 11/1996 | Tamayama | 348/250 |
| 5,912,703 | * 6/1999 | Tamayama | 348/241 |

* cited by examiner

Primary Examiner—Wendy Garber
Assistant Examiner—Aung S. Moe
(74) Attorney, Agent, or Firm—Sughrue, Mion, Zinn, Macpeak & Seas, PLLC

(57) ABSTRACT

A solid-state image sensing device compensates for reset noise by integrated correlated double sampling to determine a difference between a reference signal obtained in a feed through period and a video signal obtained in a video signal time period. The device reduces the effect of high-frequency noise through integration. The problem of small CCD output affecting the linearity of integration is compensated by an integration coefficient control device that controls an integration coefficient of an integrating circuit. The integration coefficient control device performs this control in dependence on an applied control signal. Under low light conditions, a control signal applied to the integration coefficient control device changes the integration coefficient so that an integrated value of the integrating circuit is enlarged. The enlarged integrated value of the integrating circuit provides improved linearity and makes the apparatus less susceptible to noise from other circuits.

10 Claims, 27 Drawing Sheets

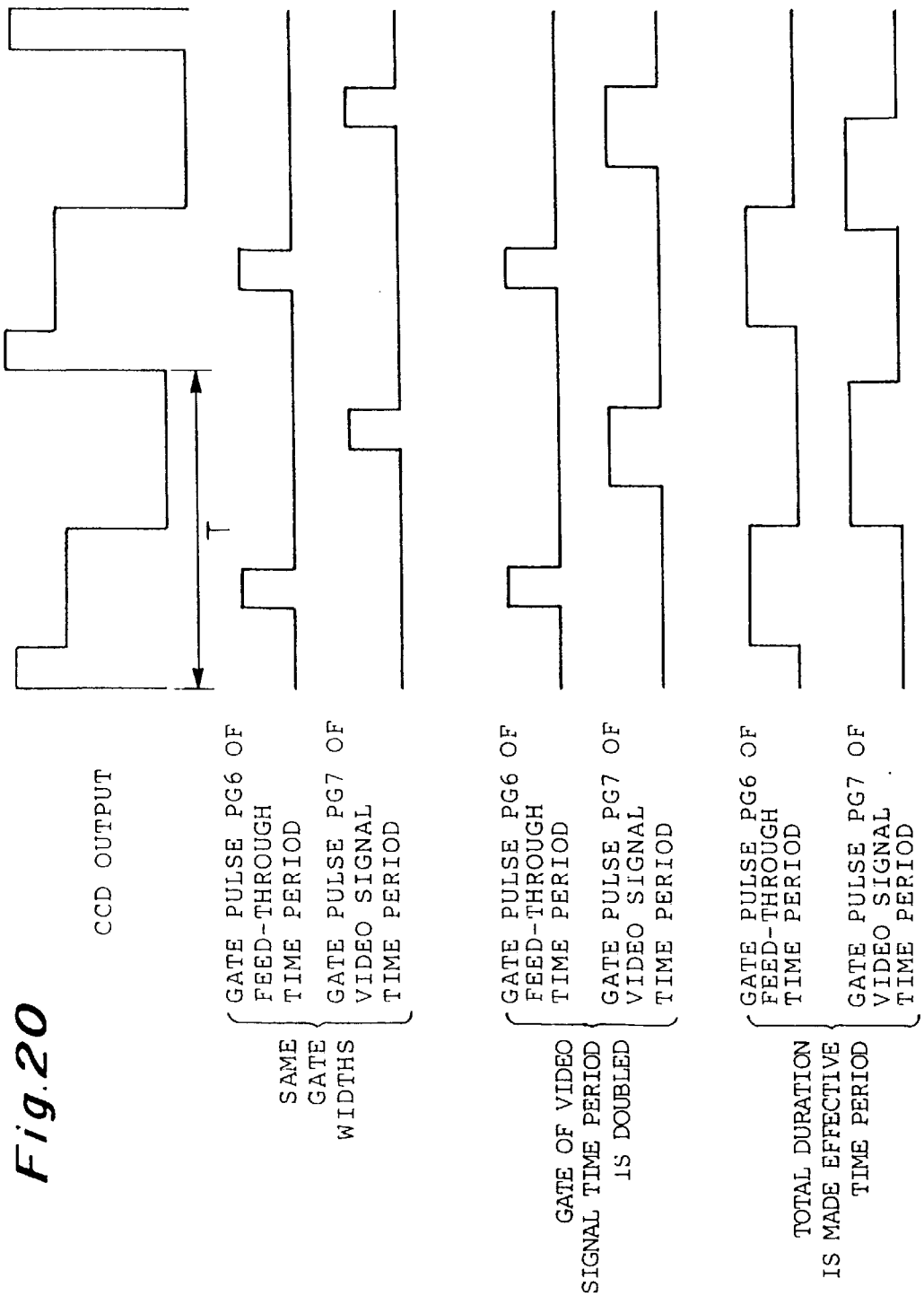

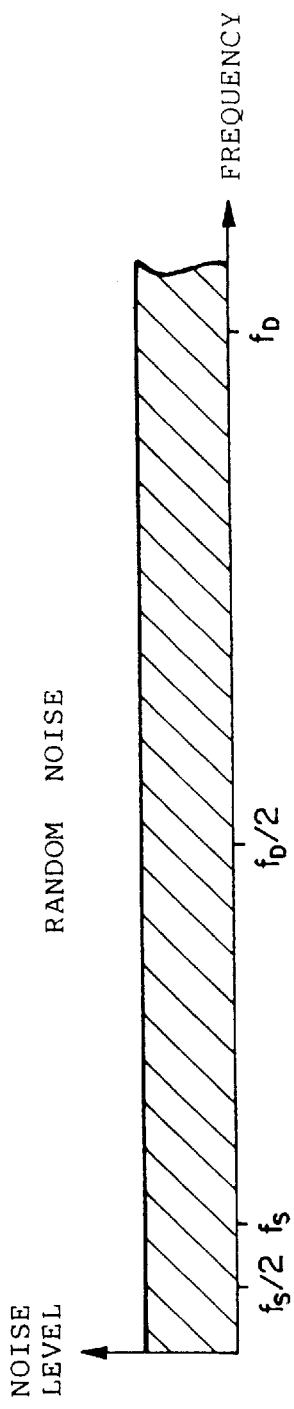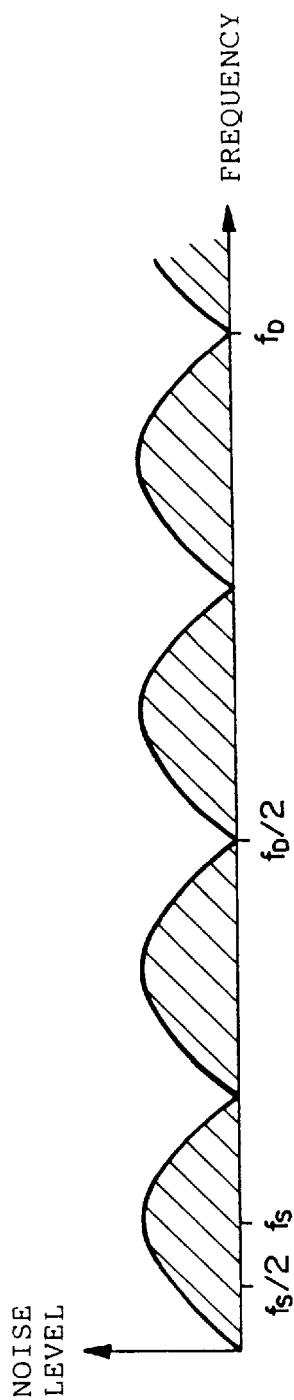
Fig.21a
Fig.21b

APPARATUS FOR READING SIGNALS OUT OF SOLID-STATE IMAGE SENSING DEVICE

This is a divisional of application Ser. No. 08/757,946 filed Nov. 27, 1996 now U.S. Pat. No. 5,912,703, the disclosure of which is incorporated herein by reference.

BACKGROUND OF THE INVENTION

1. Field of the Invention

This invention relates to an apparatus for reading signals out of a solid-state image sensing device such as a CCD (charge-coupled device).

2. Description of the Related Art

FIG. 25 illustrates an example of a conventional apparatus for reading signals out of a CCD, and FIG. 26 is a waveform diagram of signals which flow into each circuit of the apparatus shown in FIG. 25.

The CCD 10 includes a number of photodiodes 2 arrayed in the vertical and horizontal directions. By irradiating the CCD 10 with light, signal charge conforming to the amount of irradiation is accumulated in the photodiodes 2. By applying driving pulses to the CCD 10, the signal charge that has accumulated in the photodiodes 2 is applied to a floating diffusion amplifier circuit (FDA) 5 via vertical transfer lines 3 and a horizontal transfer line 4. The signal charge is amplified in the FDA 5 and then outputted from the CCD 10, in the manner described below, as a video signal component $S_3$.

Whenever the signal charge that has accumulated in one photodiode is read out (the period at which this occurs is referred to as one pixel period T), a reset pulse is applied to the FDA 5, whereby the FDA 5 is reset, as shown in FIG. 26. By adding the reset pulse component to the output signal of the horizontal transfer line 4 during the time period $t_1$ that the H-level reset pulse is being applied to the FDA 5, a first signal component $S_1$ having a predetermined level is outputted from the CCD 10. When the reset pulse reverts from the H level to the L level, a feed-through signal component $S_2$ having a level lower than that of the first signal component $S_1$ is outputted from the CCD 10 during a feed-through time period $t_2$. When the feed-through time period $t_2$ elapses, a video signal component $S_3$ having a level which corresponds to the amount of signal charge that has accumulated in the photodiodes 2 is outputted during a video signal time period $t_3$. The level of the feed-through signal component $S_2$ is used as the reference level of the video signal component $S_3$.

The first signal component $S_1$ contains noise to some extent. Consequently, the level of the feed-through signal component $S_2$ fluctuates owing to noise contained in the first signal component $S_1$ at the moment t of the transition from the reset time period $t_1$ to the feed-through time period $t_2$. For example, if the noise spikes at the transition point t, as indicated at A in FIG. 26, the level of the feed-through signal component $S_2$ rises correspondingly. Conversely, if the noise declines at the transition point t, as indicated at B, the level of the feed-through signal component $S_2$ also falls. This fluctuation in the level of the feed-through signal component $S_2$, which fluctuates as a result of the noise in the first signal component $S_1$, is referred to as "reset noise." The video signal component $S_3$ also is influenced by the noise contained in the first signal component $S_1$ and the level thereof fluctuates in the same manner as the level of the feed-through signal component $S_2$. The difference between the levels of the feed-through signal component $S_2$ and video signal component $S_3$ represents the amount of signal charge that has accumulated in the photodiodes 2 of the CCD 10, irrespective of whether reset noise is present or not.

A correlated double-sampling (referred to as "CDS" below) circuit is known as a CCD output-signal readout circuit which detects a signal representing the difference in levels mentioned above. The CDS circuit extracts the feed-through signal component $S_2$ and video signal component $S_3$ by sampling the CCD output signal in the feed-through time period $t_2$ and in the video signal time period $t_3$, and eliminates the reset noise component by taking the difference between these extracts signal components.

However, the signal outputted by the CCD 10 includes not only reset noise but also a high-frequency noise component for which there is no correlation between the feed-through time period $t_2$ and video signal time period $t_3$. Such high-frequency noise causes a deterioration in the S/N ratio because it is reflected in the low-frequency region owing to the sampling operation of the CDS circuit.

An integrating-type correlated double-sampling circuit of the kind shown in FIG. 25 is known as a circuit capable of eliminating the drawbacks of the CDS circuit described above. In the apparatus illustrated in FIG. 25, integrating circuits 111, 112 are provided in front of a CDS circuit 117 composed of sample-and-hold circuits 113, 114, 115 and a differential amplifier circuit 116. The output signal of the CCD 10 is applied to the integrating circuits 111, 112 via a buffer circuit 11. The integrating circuit 112 comprises a resistor 121, a gate switch 122, a capacitor 123, a reset switch 124 and a buffer amplifier circuit 125. A gate pulse $PG_{A1}$ is applied to the gate switch 122 in such a manner that the output signal of the CCD will be integrated during the feed-through time period $t_2$. A reset pulse $RS_{A1}$ for resetting the integrating capacitor 123 is applied to the reset switch 124 immediately before this integration starts. Similarly, the integrating circuit 111 comprises a resistor 126, a gate switch 127, a capacitor 128, a reset switch 129 and a buffer amplifier circuit 130. A gate pulse $PG_{B1}$ is applied to the gate switch 127 in such a manner that the output signal of the CCD will be integrated during the video signal period $t_3$. A reset pulse $RS_{B1}$ for resetting the integrating capacitor 128 is applied to the reset switch 129. Thus, integrated signals corresponding to the feed-through signal component $S_2$ and video signal component $S_3$ are obtained from the outputs of the integrating circuits 112, 111, respectively. These integrated outputs are sampled and held and then fed into the differential amplifier circuit 116, whence a video signal from which reset noise has been canceled is obtained. Since high-frequency noise components contained in the CCD output signal are eliminated by the integrating circuits in this integrating-type CDS circuit, the reflecting of these high-frequency noise components in the low-frequency region owing to the sampling operation is reduced and it is possible to achieve CCD signal readout in which the effect of noise reduction is outstanding.

With a CCD signal readout apparatus of this kind, however, the charging and discharging currents in the integrating circuits become extremely small when the output signal level of the CCD is small, the linearity of integration diminishes and the apparatus is readily susceptible to noise from other circuits.

FIG. 27 illustrates another example of a conventional apparatus for reading signals out of a CCD, and FIG. 28 is a waveform diagram of signals which flow into the various circuits of the apparatus shown in FIG. 27. Items in FIGS. 27 and 28 that are identical with those shown in FIGS. 25 and 26 are designated by like reference characters and need not be described again.

In order to detect the signal representing the difference in the levels between the feed-through signal component $S_2$ and video signal component $S_3$, the apparatus shown in FIG. 27 is provided with an inverting amplifier circuit 131, a non-inverting amplifier circuit 132 and gate circuits 133A and 133B. A signal outputted by the CCD 10 is applied to the inverting amplifier circuit 131 and the non-inverting amplifier circuit 132. A signal inverted and amplified by the inverting amplifier 131 is applied to the first gate circuit 133A. A signal amplified by the non-inverting amplifier circuit 132 is applied to the second gate circuit 133B. A first gate pulse $PG_{A2}$ which attains the H level during the time of the feed-through time period $t_2$ is applied to the first gate circuit 133A, and a second gate pulse $PG_{B2}$ which attains the H level during the time of the video signal time period $t_3$ is applied to the second gate circuit 133B. When the applied gate pulses $PG_{A2}$ and $PG_{B2}$ at the H level, the input signals pass through the gate circuits 133A and 133B, whereby the feed-through signal component $S_2$ and video signal component $S_3$ are obtained. By adding the signals that have passed the through gate circuits 133A and 133B, a signal representing the level difference between the feed-through signal component $S_2$ and video signal component $S_3$ is obtained. This difference signal represents video.

The signal outputted by the CCD 10 contains not only reset noise but also noise, such as high-frequency noise, in which there is no correlation between the feed-through time period $t_2$ and video signal time period $t_3$. As before, such noise is included in the signal representing the level difference between the feed-through signal component $S_2$ and video signal component $S_3$. In order to reduce this noise, the apparatus shown in FIG. 27 is provided with an integrating circuit 134 for integrating the difference signal. The noise is reduced by using the integrating circuit 134 to integrate the signals representing the level difference.

To detect a difference in integrated values correctly, it is required that the integrating interval in the feed-through signal time period and the integrating interval in the video signal time period be made to coincide. This means that the integrating interval must be made to conform to the shorter of the feed-through signal time period and video signal time period. Consequently, efficacious integration cannot be carried out over a long integration time.

SUMMARY OF THE INVENTION

An object of the present invention is to perform an excellent integrating operation to reduce noise in the output signal of a solid-state image sensing device, even if the output signal level of the device is low.

Another object of the present invention is to perform efficacious integration over a long period of time to reduce noise contained in the output signal of a CCD.

According to a first aspect of the present invention, the foregoing objects are attained by providing an apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit over a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising a signal component extracting circuit for extracting the video signal component and the feed-through signal component from signal components outputted by the solid-state image sensing device, a difference signal detecting circuit for detecting and outputting a signal representing a difference between the video signal component and the feed-through signal component extracted by the signal component extracting circuit, an integrating circuit for integrating the difference signal outputted by the difference signal detecting circuit, and an integration coefficient control device for controlling an integration coefficient of the integrating circuit in dependence upon an applied control signal in such a manner that an integrated value from the integrating circuit is enlarged.

The first aspect of the invention also provides a method of reading a signal out of the above-mentioned solid-state image sensing device. More specifically, the method comprises steps of extracting the video signal component and the feed-through signal component from signal components outputted by the solid-state image sensing device, obtaining a signal representing a difference between the extracted video signal component and the feed-through signal component, controlling an integration coefficient in dependence upon an applied control signal in such a manner that an integrated value is enlarged, and integrating the difference signal based upon the controlled integration coefficient.

In accordance with the first aspect of the invention, a signal representing the difference between the video signal component and the feed-through signal component is detected. This difference signal is integrated by the integrating circuit. The latter has its integration coefficients controlled in dependence upon an applied control signal in such a manner that the integrated value is increased in size. As a result, the charging/discharging current of the integrating circuit can be held at a comparatively high level even if the level of the signal outputted by the solid-state image sensing device is low. Even if a subject to be imaged is dark, integration can be performed in excellent fashion and the effects of noise from other circuits can be prevented.

A color signal can be obtained by providing color separating filters for a plurality of colors, e.g., R (red), G (green) and B (blue), in front of the photoelectric transducers. In such case the apparatus would be provided with a difference-signal color separating device for separating the difference signal outputted by the difference signal detecting circuit into difference signals of the colors R, G and B.

Further, three of the integrating circuits would be provided to correspond to the difference signals of the colors R, G and B separated by the difference-signal color separating device, and the integration coefficient control device would be adapted to control the integration coefficients of these three integration circuits in dependence upon an applied control signal so as to increase the integrated values.

In this case also control can be performed so as to enlarge the integration coefficients of the integrating circuits for each of the colors R, G and B. This makes it possible to perform excellent integration even if the level of the signal outputted by the solid-state image sensing device is low. The influence of noise from other circuits can be prevented as well.

According to a second aspect of the present invention, the foregoing objects are attained by providing an apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit for a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising a video signal component integrating circuit for integrating the video signal component, from signal components outputted by the solid-state image sensing device, for a fixed period of time, a feed-through signal component integrating circuit for integrating the feed-through signal component, from components outputted by the solid-state image sensing device, for a fixed period of time, an integration coefficient control device for controlling an integration coefficient of the video signal component integrating circuit and an integration coefficient of the feed-through signal component integrating circuit in dependence upon an applied control signal in order to make the integration coefficients equal to each other and in such a manner that the integration values obtained from the integrating circuits are enlarged, and a difference signal detecting circuit for outputting a signal representing a difference value between an integrated value of the video signal outputted by the video signal component integrating circuit and an integrated value of the feed-through signal component outputted by the feed-through signal component integrating circuit.

The second aspect of the invention also provides a method of reading a signal out of the above-mentioned solid-state image sensing device. More specifically, the method comprises steps of controlling integration coefficients in dependence upon an applied control signal in such a manner as to enlarge integrated values, integrating the video signal component and the feed-through signal component for fixed periods of time based upon the controlled integration coefficients, and obtaining a signal representing a difference value between an integrated value of the video signal component and an integrated value of the feed-through signal component.

In accordance with the second aspect of the invention, the video signal component and the feed-through signal component in the signal outputted by the solid-state image sensing device are integrated in the video signal component integrating circuit and feed-through signal component integrating circuit, respectively. The video signal component integrating circuit and feed-through signal component integrating circuit have their integration coefficients controlled in dependence upon an applied control signal in such a manner that the integrated values are increased in size. The signal representing the difference between the integrated value of the video signal component and the integrated value of the feed-through signal component is obtained from the difference signal detecting circuit.

According to the second aspect of the invention as well, excellent integration can be realized in the video signal component integrating circuit and feed-through signal component integrating circuit even if the level of the signal outputted by the solid-state image sensing device is low. Though the video signal component and feed-through signal component are integrated separately, the integration coefficients are controlled in such a manner that the integration coefficients of the video signal component integrating circuit and the integration coefficients of the feed-through signal component integrating circuit become equal. The video signal component and feed-through signal component are integrated in equal proportions as well. In a case where the signal representing the difference between the integrated value of the video signal component and the integrated value of the feed-through signal component is detected, a signal representing a correct difference value corresponding to the amount of signal charge that has accumulated in the photoelectric transducers can be obtained.

Color-separation filters for a plurality of colors, e.g., R, G and B, may be provided in front of the photoelectric transducers in the second aspect of the invention as well. In such case the apparatus would be provided with a signal color separating device for separating the signal outputted by the solid-state image sensing device into signals of the colors R, G and B.

Further, three of the video signal integrating circuits would be provided to correspond to the plurality of color signals separated by the signal color separating device, e.g., signals of the colors R, G and B, and three feed-through signal component integrating circuit would be provided to correspond to the signals of the colors R, G and B separated by the signal color separating device. The integration coefficient control device would be adapted to control the integration coefficients, in dependence upon the applied control signal, to make the coefficients equal to each other, so as to enlarge the integrated values in the video signal component integrating circuit and feed-through signal component integrating circuit for the signal of color R, in the video signal component integrating circuit and feed-through signal component integrating circuit for the signal of color G, and in the video signal component integrating circuit and feed-through signal component integrating circuit for the signal of color B. Three of the difference signal detecting circuits would be provided to correspond to the colors R, G and B, and these would output signals representing the difference values between respective ones of the integrated values of the video signals outputted by,the video signal component integrating circuits for the colors R, G and B and the integrated values of the video signals outputted by the feed-through signal component integrating circuits for the colors R, G and B.

The integrating circuits each comprises a voltage/current converting circuit, in which a voltage/current conversion coefficient is variable, for converting input voltage to current at a conversion ratio in accordance with the voltage/current conversion coefficient, and outputting the current, a capacitor charged by the output current of the voltage/current converting circuit, and a discharging device for clearing signal charge that has accumulated in the capacitor. In this case the integration coefficient control device should be such that the voltage/current converting coefficients can be changed.

Further, the integration coefficient control device may be such that input resistance of the integrating circuit or capacitance of the capacitor constructing the integrating circuit can be changed.

According to a third aspect of the present invention, the foregoing objects are attained by providing an apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit for a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising a first gate circuit for outputting a signal component, which is outputted by the solid-state image sensing device, as a first extracted captured-image signal for a first period of time that includes the duration of the feed-through signal component, a second gate circuit for outputting a signal component, which is outputted by the solid-state image sensing device, as a second extracted captured-image signal for a second period of time that is different from the first period of time and includes part of the duration of the video signal component, a first averaging circuit for averaging the first extracted captured-image signal outputted by the first gate circuit and outputting the averaged signal as a first average captured-image signal, a second averaging circuit for averaging the second extracted captured-image signal outputted by the second gate circuit and outputting the averaged signal as a second average captured-image signal, a level adjusting device for adjusting the level of at least one of the first average captured-image signal, which is outputted by the first averaging circuit, and the second average captured-image signal, which is outputted by the second averaging circuit, at the ratio of the first period of time to the second period of time, and a difference signal detecting circuit for detecting and outputting a signal representing a difference between the first average captured-image signal and the second average captured-image signal the signal level of which has been adjusted by the level adjusting device.

The third aspect of the invention also provides a method of reading a signal out of the above-mentioned solid-state image sensing device. More specifically, the method comprises steps of extracting a signal component, which is outputted by the solid-state image sensing device, as a first extracted captured-image signal for a first period of time that includes the duration of the feed-through signal component, extracting a signal component, which is outputted by the solid-state image sensing device, as a second extracted captured-image signal for a second period of time that is different from the first period of time and includes part of the duration of the video signal component, averaging the first extracted captured-image signal and obtaining a first average captured-image signal, averaging the second extracted captured-image signal and obtaining a second average captured-image signal, adjusting the level of at least one of the first average captured-image signal and the second average captured-image signal at the ratio of the first period of time to the second period of time, and detecting a signal representing a difference between the first average captured-image signal and the second average captured-image signal the signal level of which has been adjusted.

In accordance with the third aspect of the invention, the first extracted captured-image signal and the second extracted captured-image signal are obtained. The first extracted captured-image signal represents a signal relating to the feed-through signal component. The second extracted captured-image signal represents a signal relating to the video signal component. The first and second extracted captured-image signals are each averaged (i.e., subjected to integration and removal of high-frequency components) and the high-frequency noise components thereof are eliminated.

The level difference between the feed-through signal component and video signal component corresponds to the amount of signal charge that has accumulated in the photoelectric transducers. However, since the first time period of the first extracted captured-image signal and the second time period of the second extracted captured-image signal differ, the level difference between the first average captured-image signal (this signal is the averaged first extracted captured-image signal) and the second average captured-image signal (this signal is the averaged second extracted captured-image signal) does not correspond to the amount of signal charge that has accumulated in the photoelectric transducers. The levels of the first average captured-image signal and of the second average captured-image signal are adjusted at the ratio of the first time period to the second time period in such a manner that the level difference between the first average captured-image signal and second average captured-image signal will correspond to the amount of signal charge that has accumulated in the photoelectric transducers. Since the level adjustment is carried out, the level difference, which is detected by the difference signal detecting circuit, between the level-adjusted first average captured-image signal and second average captured-image signal corresponds to the amount of signal charge that has accumulated in the photoelectric transducers.

In the third aspect of the invention, the first time period for obtaining the first extracted captured-image signal and the second time period of obtaining the second extracted captured-image signal differ. A time period corresponding to the time period of the feed-through signal component can be adopted as the first time period, and a time period corresponding to the time period of the video signal component can be adopted as the second time period. The above-mentioned first time period and second time period can be set to desired time periods and averaged, in dependence upon the time period of the feed-through signal and the time period of the video signal, in such a manner that noise is reduced effectively. It is possible to set a first time period and the second time period best suited to the processing for averaging the feed-through signal component and the processing for averaging the video signal component.

If the first time period and second time period differ, the detected difference value will not represent the correct difference value (i.e., the amount of signal charge that has accumulated in the photoelectric transducers) even if the difference between the averaged first extracted captured-image signal and second extracted captured-image signal, which are obtained by applying averaging processing to the first and second extracted captured-image signals, is detected. In the third aspect of the invention, the difference between the two average captured-image signals is detected upon adjusting the level of at least one of the first and second average captured-image signals at the ratio of the first time period to the second time period. As a result, the difference value obtained correctly represents the amount of signal charge that has accumulated in the photoelectric transducers.

According to a fourth aspect of the present invention, the foregoing objects are attained by providing an apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit for a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising a first gate circuit for outputting a signal component, which is outputted by the solid-state image sensing device, as a first extracted captured-image signal for a first period of time that includes the interval of the feed-through signal component, a second gate circuit for outputting a signal component, which is outputted by the solid-state image sensing device, as a second extracted captured-image signal for a second period of time that is different from the first period of time and includes part of the interval of the video signal component, a level adjusting device for adjusting the level of at least one of the first extracted captured-image signal, which is outputted by the first gate circuit, and the second extracted captured-image signal, which is outputted by the second gate circuit, at the ratio of the first period of time to the second period of time, a difference signal detecting circuit for detecting and outputting a signal representing a difference between the first extracted captured-image signal outputted by the first gate circuit or the first extracted captured-image signal level-adjusted by the level adjusting device and the second extracted captured-image signal outputted by the second gate circuit or the second extracted captured-image signal level-adjusted by the level adjusting device, and an averaging circuit for averaging and outputting the difference signal outputted by the difference signal detecting circuit.

The fourth aspect of the invention also provides a method of reading a signal out of the above-mentioned solid-state image sensing device. More specifically, the method comprises steps of obtaining, through use of a first gate circuit, a signal component, which is outputted by the solid-state image sensing device, as a first extracted captured-image signal for a first period of time that includes the interval of the feed-through signal component, obtaining, through use of a second gate circuit, a signal component, which is outputted by the solid-state image sensing device, as a second extracted captured-image signal for a second period of time that is different from the first period of time and includes part of the interval of the video signal component, adjusting the level of at least one of the first extracted captured-image signal, which is outputted by the first gate circuit, and the second extracted captured-image signal, which is outputted by the second gate circuit, at the ratio of the first period of time to the second period of time, obtaining a signal representing a difference between the first extracted captured-image signal outputted by the first gate circuit or the level-adjusted first extracted captured-image signal and the second extracted captured-image signal outputted by the second gate circuit or the level-adjusted second extracted captured-image signal, and averaging and the difference signal.

In accordance with the fourth aspect of the invention, level adjustment of at least one of the first and second extracted captured-image signals is performed before averaging processing, and a signal representing the difference between the first and second extracted captured-image signals is detected. This averaging processing is executed with regard to the signal representing the difference. Since averaging processing is executed in the fourth aspect of the invention as well, noise components are reduced.

The first time period for obtaining the first extracted captured-image signal and the second time period for obtaining the second extracted captured-image signal differ in the fourth aspect of the invention as well. A time period corresponding to the time period of the feed-through signal component can be adopted as the first time period, and a time period corresponding to the time period of the video signal component can be adopted as the second time period. The above-mentioned first time period and second time period can be set to desired time periods in dependence upon the time period of the feed-through signal and the time period of the video signal.

In a case where the averaging circuit is an integrating circuit which integrates the input signal, the level adjusting device can change the level of the input signal by changing the integration coefficient of the integrating circuit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 20 is a time chart illustrating the relationship between captured-image signals outputted by a CCD and gate pulses;

FIG. 21a illustrates random noise and FIG. 21b shows random noise of a video signal that has been subjected to correlated double-sampling processing;

DESCRIPTION OF THE PREFERRED EMBODIMENTS

Figure 1:
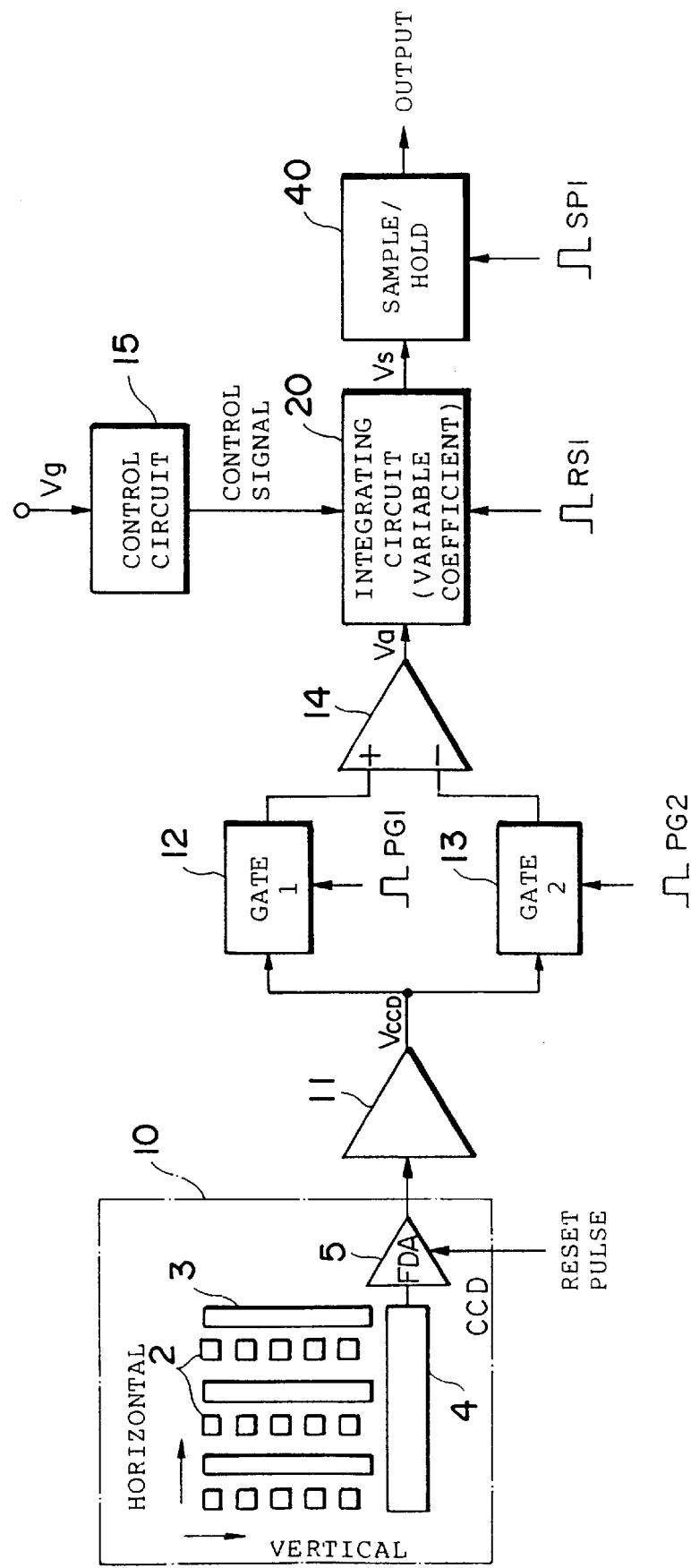
FIG. 1 is a block diagram illustrating the electrical configuration of a CCD signal readout apparatus.
Figure 2:
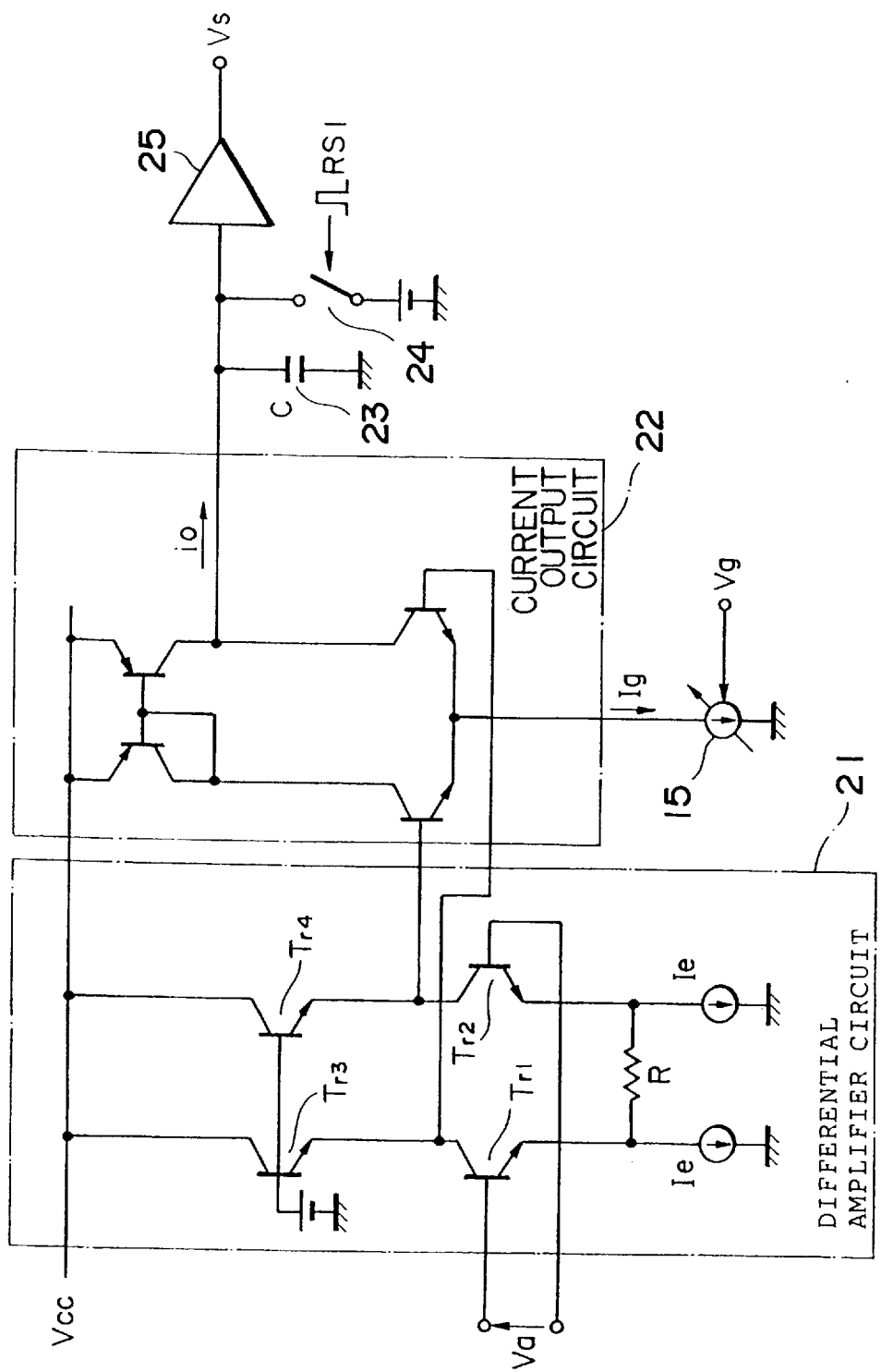
FIG. 2 is a circuit diagram showing the construction of an integrating circuit.
Figure 3:
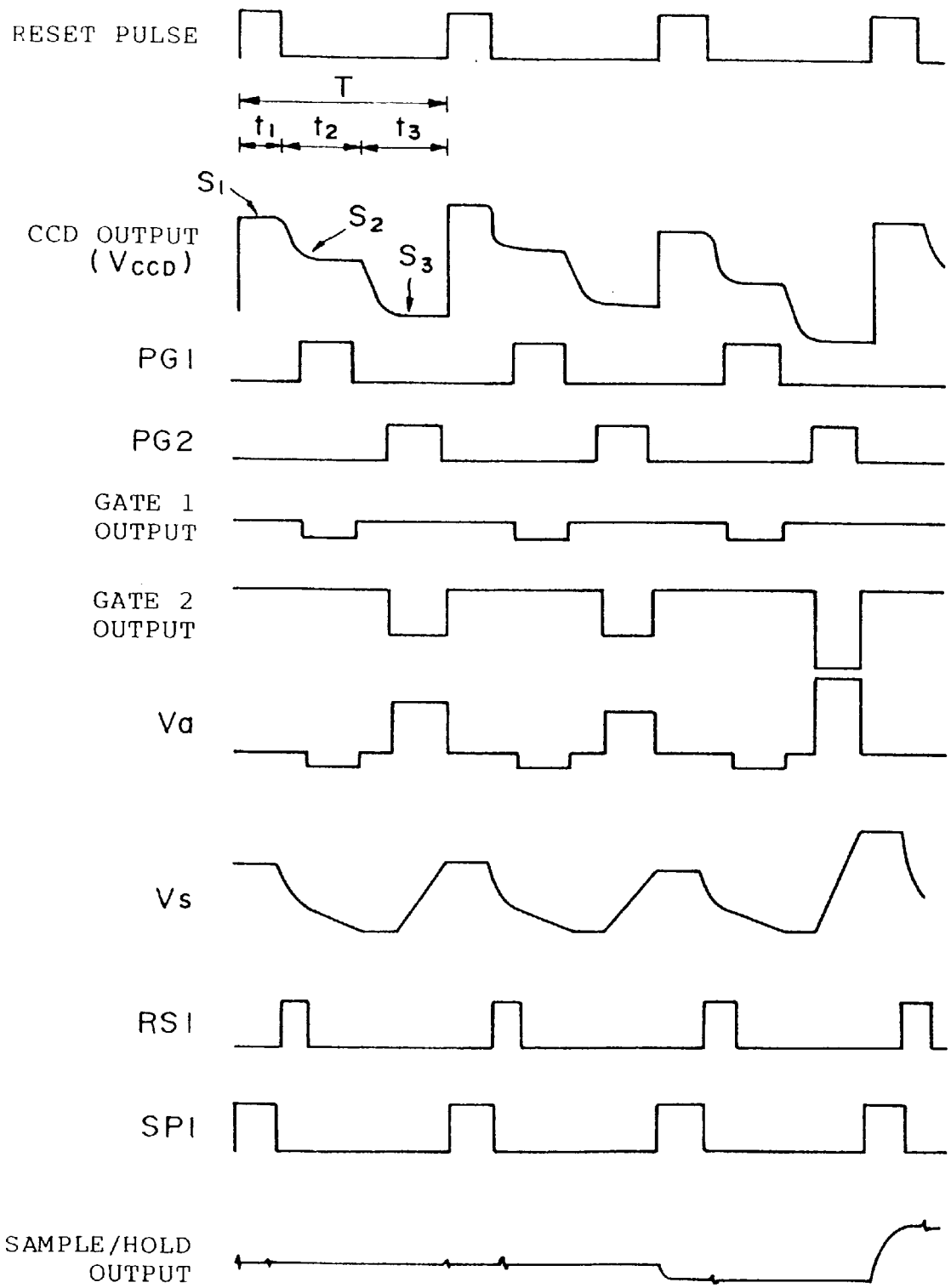
FIG. 3 is a time chart illustrating signals which flow into various circuits contained in the CCD signal readout apparatus of FIG. 1.

FIG. 1, which illustrates an embodiment of the present invention, is a block diagram showing the electrical configuration of a CCD signal readout apparatus, FIG. 2 is a circuit diagram showing the details of an integrating circuit contained in the CCD signal readout apparatus of FIG. 1, and FIG. 3 is a time chart associated with the CCD signal readout apparatus of FIG. 1.

As shown in FIGS. 1 and 3, signal charge is accumulated in the photodiodes 2 of the CCD 10 as a result of capturing the image of a subject, the charge is applied to the FDA (floating diffusion amplifier) 5 via the vertical transfer lines 3 and the horizontal transfer line 4, and the signal charge is amplified by the FDA 5. A reset pulse is applied to the FDA 5 at the pixel period T (one pixel period T is the period of time over which the signal charge that has accumulated in one photodiode 2 is read out), thereby resetting the FDA 5.

The output signal of the CCD 10 is divided into signal components $S_1$, $S_2$ and $S_3$ over a reset time period $t_1$, feed-through time period $t_2$ and video signal time period $t_3$, respectively, in one pixel period T. The first signal component $S_1$ of the reset time period $t_1$ has a reset level that corresponds to a predetermined power-supply voltage applied to the FDA 5. The feed-through signal component $S_2$ of the feed-through time period $t_2$ is used as the reference level of the video signal component $S_3$. The video signal component $S_3$, which has a level corresponding to the amount of signal charge that has accumulated in the photodiodes 2, is outputted over the video signal time period $t_3$.

The output signal produced by the CCD 10 is amplified in the amplifier circuit 11, whence it is applied to gate circuits 12 and 13.

A first gate pulse PG1, which is at the H level for the duration of the feed-through signal time period $t_2$, is applied to the first gate circuit 12. The feed-through signal component $S_2$ of the output signal from the CCD 10 is outputted through the first gate circuit 12. The feed-through signal component $S_2$ that has passed through the first gate circuit 12 is applied to a positive input terminal of a differential amplifier 14. A second gate pulse PG2, which is at the H level for the duration of the video signal time period $t_3$, is applied to the second gate circuit 13. The video signal component $S_3$ of the output signal from the CCD 10 is outputted through the second gate circuit 13. The video signal component $S_3$ that has passed through the second gate circuit 13 is applied to a negative input terminal of the differential amplifier 14.

A signal representing the difference between the feed-through signal component $S_2$ and the video signal component $S_3$ is detected in the differential amplifier 14. This signal is amplified by the differential amplifier 14 and then outputted as a difference signal Va. The difference signal Va is applied to an integrating circuit 20 the integrating coefficient of which can be varied. The level of the feed-through signal component $S_2$ is used as the reference level of the video signal component $S_3$, and the level of the difference signal Va corresponds to the amount of signal charge that has accumulated in the photodiodes 2.

The integrating circuit 20 integrates the difference signal Va applied thereto. A reset pulse RS1 is applied to the integrating circuit 20, thereby resetting the same, each time the difference signal Va of one pixel period T is integrated. The integrating circuit 20 is capable of changing its integration coefficient and is provided with a control circuit 15 for this purpose. A control voltage Vg for changing the integration coefficient is applied to the control circuit 15. The control voltage Vg would have its magnitude determined by a volume adjustment (not shown) performed by the user. In response to application of the control voltage Vg to the control circuit 15, the control circuit 15 provides the integrating circuit 20 with a control signal that changes the integration coefficient. The integrating circuit 20 performs integration using the integration coefficient that conforms to the control signal provided by the control circuit 15.

Since the difference signal Va outputted by the differential amplifier 14 is integrated in the integrating circuit 20, high-frequency noise contained in the output signal of the CCD 10 is averaged, as a result of which the high-frequency noise is reduced.

The signal representing the integrated value from the integrating circuit 20 is applied to a sample-and-hold circuit 40. A sampling pulse SP1, which has a period the same as that of the reset pulse RS1 applied to the integrating circuit 20, and which decays at the leading edge of the reset pulse RS1, is applied to the sample-and-hold circuit 40. The level of a signal Vs, which is entering the sample-and-hold circuit 40 when the sampling pulse SP1 is applied, is maintained until the next sampling pulse SP1 is applied. The signal whose level has been maintained becomes the output of the sample-and-hold circuit 40 and is delivered as the output of the CCD signal readout apparatus.

The signal outputted by the CCD signal readout apparatus is subjected to signal processing such as a gamma correction, after which the signal is recorded on a recording medium such as a memory card or magnetic tape.

The integrating operation of the integrating circuit 20 will now be described with reference to FIG. 2.

The integrating circuit 20 includes a differential amplifier circuit 21, a current output circuit 22, a capacitor 23, a reset switch 24 and an amplifier circuit 25.

The differential amplifier circuit 21 includes transistors Tr1 and Tr2 to the emitters of which respective current sources Ie are connected. The emitter of the transistor Tr1 and the emitter of the transistor Tr2 are connected by a resistor R. A power-supply voltage Vcc is applied to the collectors of the transistors Tr1 and Tr2 via transistors Tr3 and Tr4, respectively. The input voltage Va of the integrating circuit 20 is applied across the base of transistor Tr1 and the base of transistor Tr2. The input voltage Va is amplified in the differential amplifier circuit 21 and then applied to the current output circuit 22.

A variable current source 15 serving as the control circuit is connected to the current output circuit 22. The variable current source 15 has the magnitude of its current Ig controlled by the control voltage Vg.

The current output circuit 22 produces an output current io expressed by the following equation:

$$io = Ig/RIe \cdot Va \qquad \text{Eq. (1)}$$

where Va represents the input voltage of the integrating circuit 20, R the resistance value of the resistor R contained in the differential amplifier circuit 21, Ie the current which flows into the current source Ie contained in the differential amplifier circuit 21, and Ig the current that flows into the variable current source 15.

The magnitude of the output current io of the current output circuit 22 can be changed by changing the magnitude of the current Ig which flows into the variable current source 15.

The current output circuit 22 is connected to the amplifier circuit 25. The capacitor 23 and the reset switch 24 is connected between the current output circuit 22 and the amplifier circuit 25. When the reset switch 24 is turned off (opened), the capacitor 23 is charged by the output current io of the current output circuit 22. A voltage is applied to the amplifier circuit 25 in accordance with the amount of charge in the capacitor 23, and the voltage is amplified and outputted as an integrated voltage Vs. When the reset switch 24 is turned on (closed), the signal charge that has accumulated in the capacitor 23 is discharged via the reset switch 24.

The output voltage Vs of the integrating circuit shown in FIG. 2 can be expressed by the following equation:

$$Vs = \frac{Ig}{RIe} \int Va \, dt \qquad \text{Eq. (2)}$$

Accordingly, integration coefficient (Ig/RIe) can be controlled by controlling the current Ig that flows into the current source 15.

Figure 4:
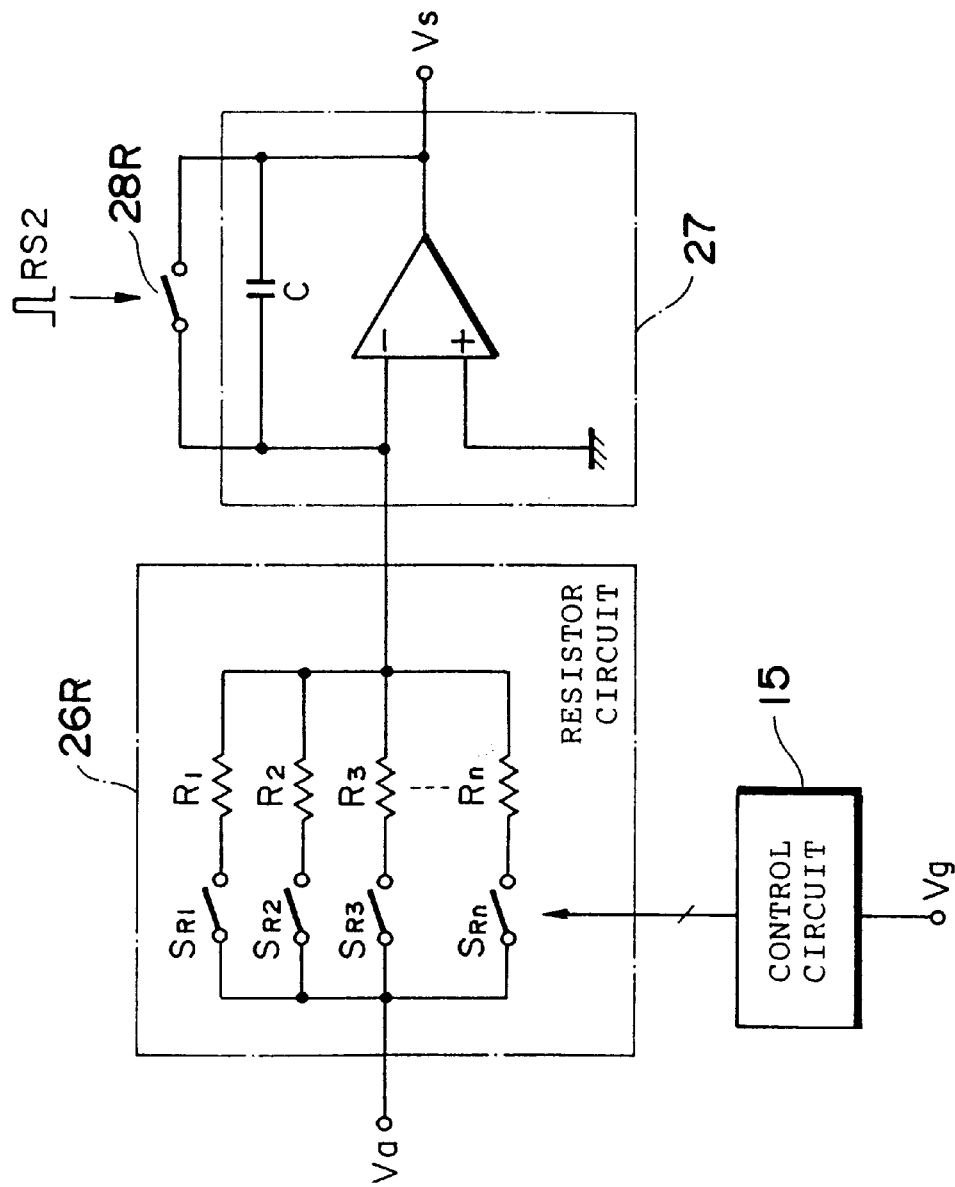
FIG. 4 is a circuit diagram showing another construction of an integrating circuit.

FIG. 4 is a circuit diagram illustrating another example of the integrating circuit. Whereas the integrating circuit of FIG. 2 controls the integration coefficient by controlling the current Ig, the integrating circuit shown in FIG. 4 controls the integration coefficient by controlling a resistance value.

The integrating circuit of FIG. 4 includes an integrator 27, which is externally provided with a reset switch 28R. A resistor circuit 26R is connected to the input terminal of the integrator 27. The resistor circuit 26R comprises a plurality of parallel-connected resistors $R_1 \sim R_n$ and a plurality of parallel-connected resistor selection switches $S_{R1} \sim S_{Rn}$. Desired resistor selection switches among the plurality of resistor selection switches $S_{R1} \sim S_{Rn}$ have their on/off action controlled by a control signal from the control circuit 15. The combined resistance of the resistor circuit 26R is changed by changing the combination of the resistor selection switches turned on.

The integrating circuit shown in FIG. 4 produces the output voltage Vs, which can be expressed by the following equation:

$$Vs = \frac{1}{RC} \int Va \, dt \qquad \text{Eq. (3)}$$

where R represents the combined resistance of the resistor circuit 26R, C the capacitance of a capacitor C included in the integrator 27, and Va the input voltage.

The integration coefficient (1/RC) can be changed by changing the combined resistance R of the resistor circuit 26R.

Figure 5:
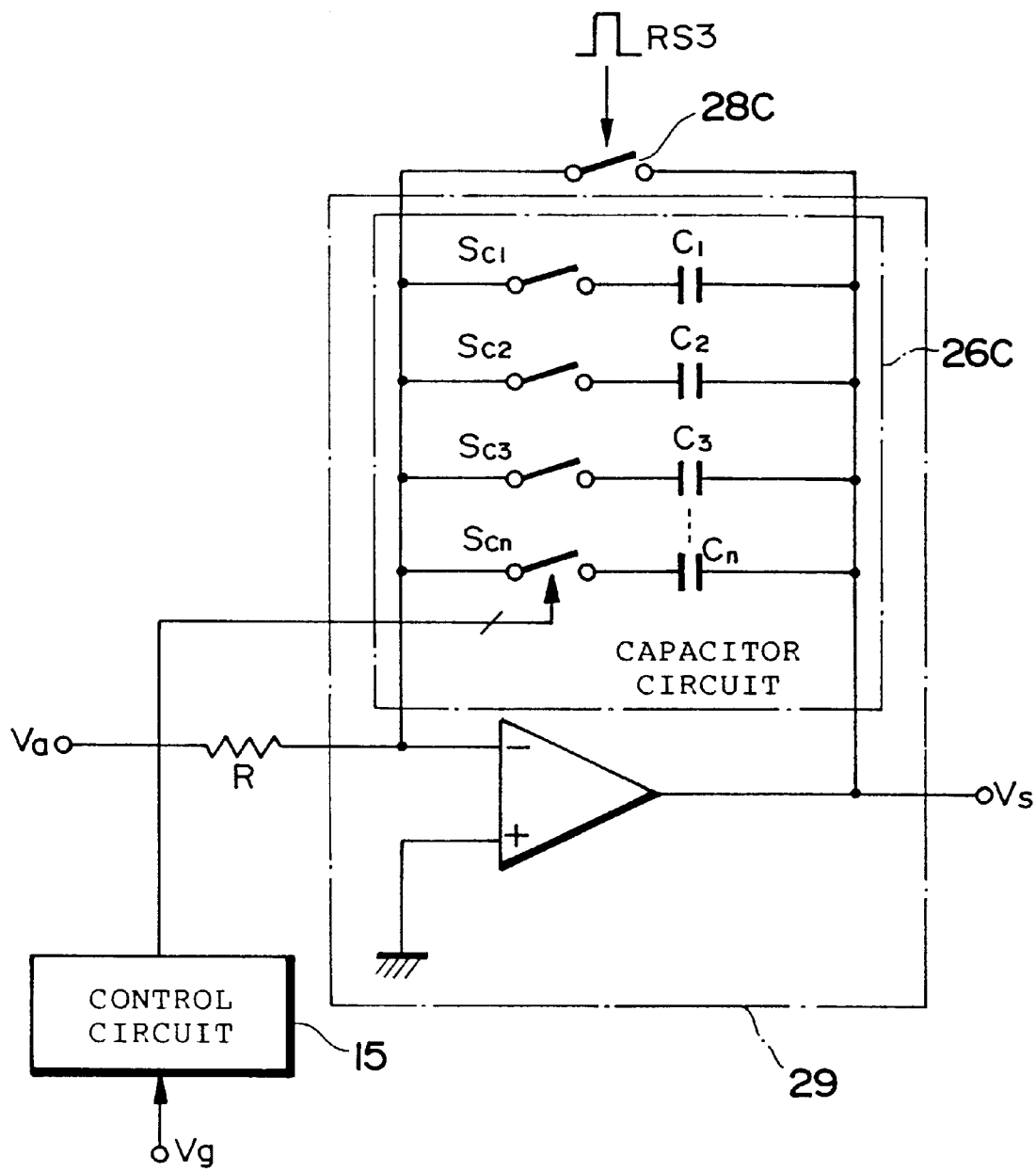
FIG. 5 is a circuit diagram showing another construction of an integrating circuit.

FIG. 5 is a circuit diagram illustrating another example of the integrating circuit. Whereas the integrating circuit of FIG. 4 changes the integration coefficient by changing the combined resistance R of the resistor circuit 26R, the integrating circuit shown in FIG. 5 changes the integration coefficient by changing the combined capacitance of a capacitor circuit 26C.

The integrating circuit of FIG. 5 includes an integrator 29. A capacitor circuit 26C and a reset switch 28C are parallel-connected to the integrator 29. The capacitor circuit 26C comprises a plurality of parallel-connected capacitors $C_1 \sim C_n$ and a plurality of parallel-connected capacitor selection switches $S_{C1} \sim S_{Cn}$. Desired capacitor selection switches among the plurality of capacitor selection switches $S_{C1} \sim S_{Cn}$ have their on/off action controlled by a control signal outputted by the control circuit 15. The combined capacitance of the capacitor circuit 26C is changed by changing the combination of the capacitor selection switches turned on. A resistor R is connected to the input terminal of the integrator 29.

The integrating circuit shown in FIG. 5 produces the output voltage Vs expressed by Eq. (3), where C represents the combined capacitance of the capacitor circuit 26C, R the resistance value of the resistor R, and Va the input voltage.

The integration coefficient (1/RC) can be changed by changing the combined capacitance C of the capacitor circuit 26C.

Figure 6:
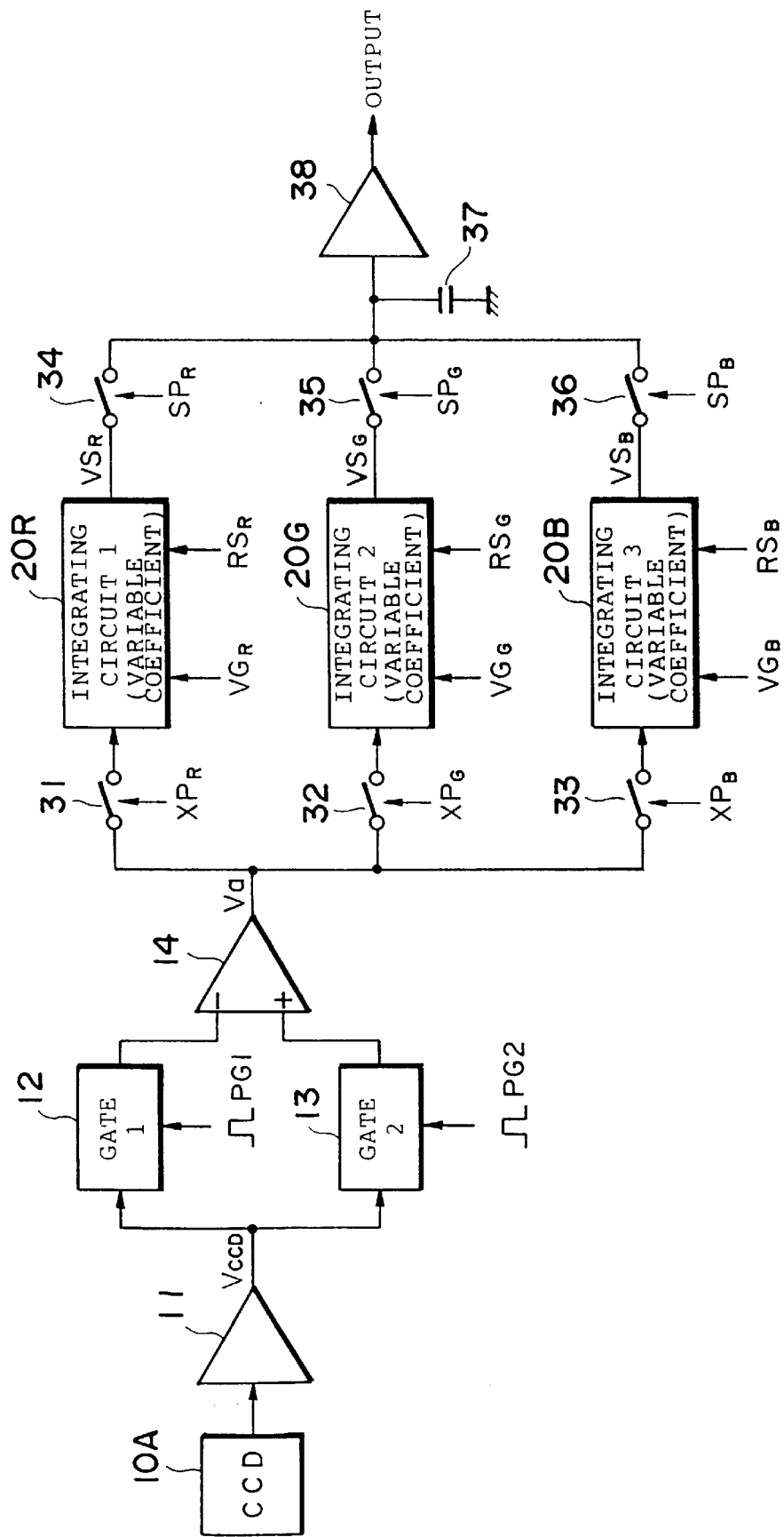
FIG. 6 is a block diagram illustrating the electrical configuration of a CCD signal readout apparatus according to another embodiment of the invention.
Figure 7:
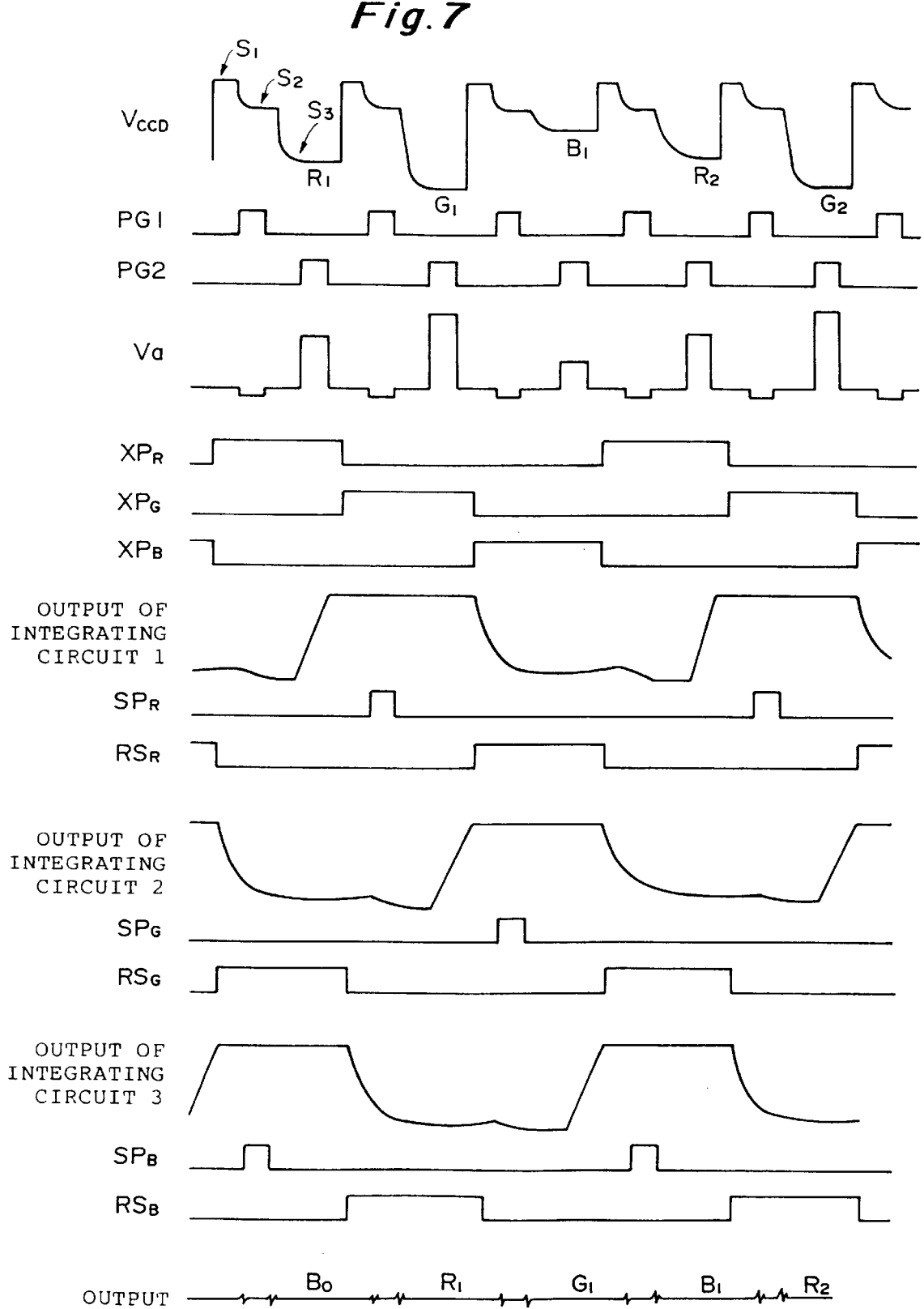
FIG. 7 is a time chart illustrating signals which flow into various circuits contained in the CCD signal readout apparatus of FIG. 6.

FIG. 6, which illustrates another embodiment of the present invention, is a block diagram showing the electrical configuration of a CCD signal readout apparatus. Components in FIG. 6 that are identical with those shown in FIG. 1 are designated by like reference characters and need not be described again. FIG. 7 is a time chart representing signals that flow into the various circuits of the CCD signal readout apparatus shown in FIG. 6.

The CCD signal readout apparatus shown in FIG. 6 is so adapted as to be capable of accommodating color image signals.

Color filters for the colors R, G and B are provided in front of the CCD 10A. As shown in FIG. 7, captured-image signals representing R (red), G (green) and B (blue) are outputted by the CCD 10A every pixel period. Except for the fact that it is provided with the color filters, the construction of the CCD 10A is the same as that of the CCD 10. Furthermore, though three color filters for the three colors R, G and B are illustrated in this embodiment, this does not impose a limitation upon the invention; any other types of color filters may be provided if desired.

The difference voltage signal va outputted by the differential amplifier 14 is applied to extraction switches 31, 32 and 33. Control pulses $XP_R$, $XP_G$ and $XP_B$ are applied to the extraction switches 31, 32 and 33, respectively, and these are turned on when difference voltages for the colors R, G and B, respectively, are outputted by the differential amplifier 14. Difference voltage signals for the colors R, G and B are obtained by the extraction switches 31, 32 and 33, respectively.

The difference voltage signals for the colors R, G and B are applied to integrating circuits 20R, 20G and 20B, respectively, which proceed to integrate these R, G and B difference voltage signals, respectively. Difference voltage signals $VS_R$, $VS_G$ and $VS_B$, which are obtained by the integration performed in the integrating circuits 20R, 20G and 20B, are applied to sampling switches 34, 35 and 36, respectively.

Sampling pulses $SP_R$, $SP_G$ and $SP_B$ are applied to the sampling switches 34, 35 and 36, respectively. The sampling pulses $SP_R$, $SP_G$ and $SP_B$ turn on the sampling switches 34, 35 and 36 when the integrated R, G and B difference signals outputted by the integrating circuits 20R, 20G and 20B peak. The integrated voltage signals $VS_R$, $VS_G$ and $VS_B$ sampled in the sampling switches 34, 35 and 36, respectively, charge the capacitor 37. The integrated voltage signals $VS_R$, $VS_G$ and $VS_B$ are combined in the capacitor 37, amplified in an amplifier circuit 38 and outputted as an amplified signal.

The levels of the R, G and B signal components can be adjusted in the circuit of FIG. 6 by changing the integration coefficients of the integrating circuits 20R, 20G and 20C. Accordingly, a color-balance adjustment is possible. It is unnecessary to specially provide a color-balance adjusting circuit, thus making it possible to reduce the size of an apparatus using this CCD signal readout circuit.

Figure 8:
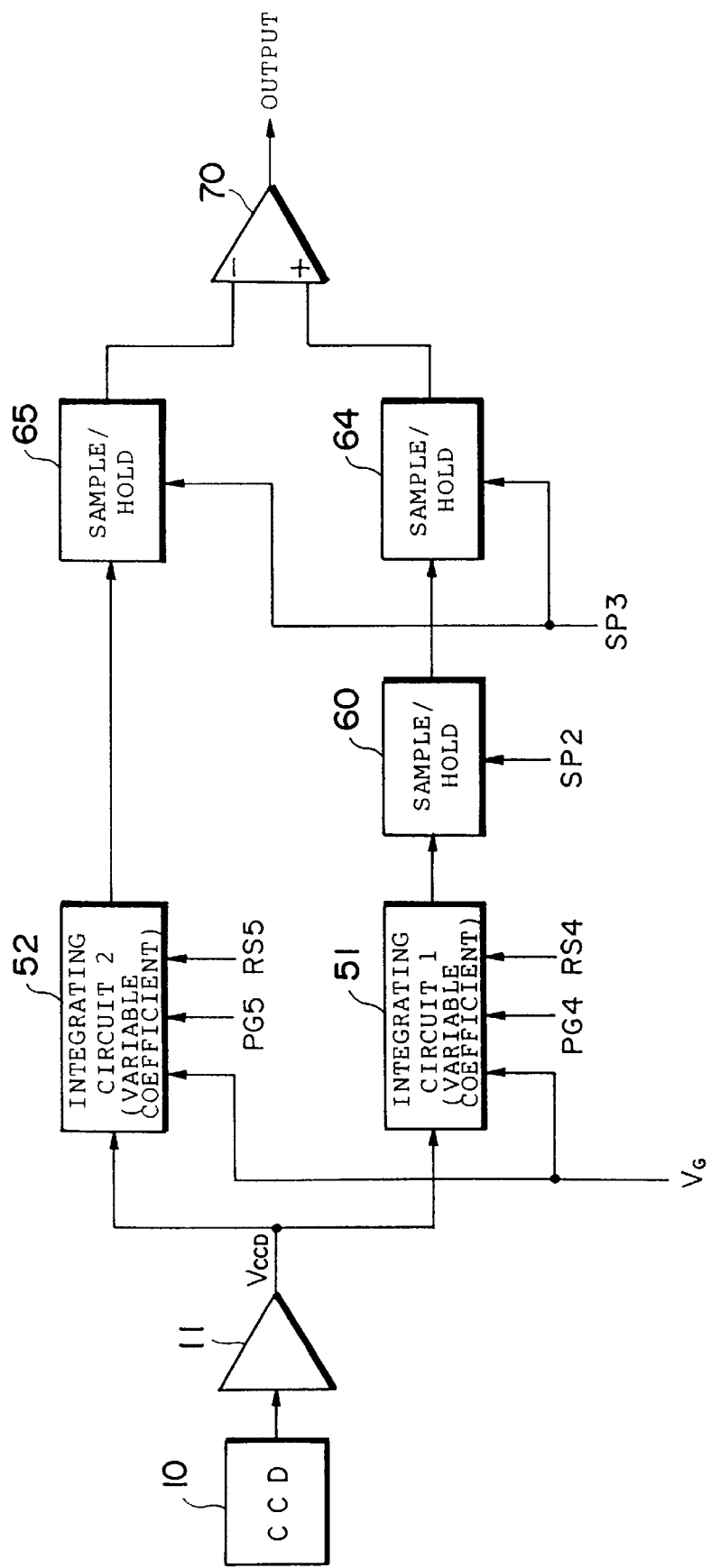
FIG. 8 is a block diagram illustrating the electrical configuration of a CCD signal readout apparatus according to another embodiment of the invention.
Figure 9:
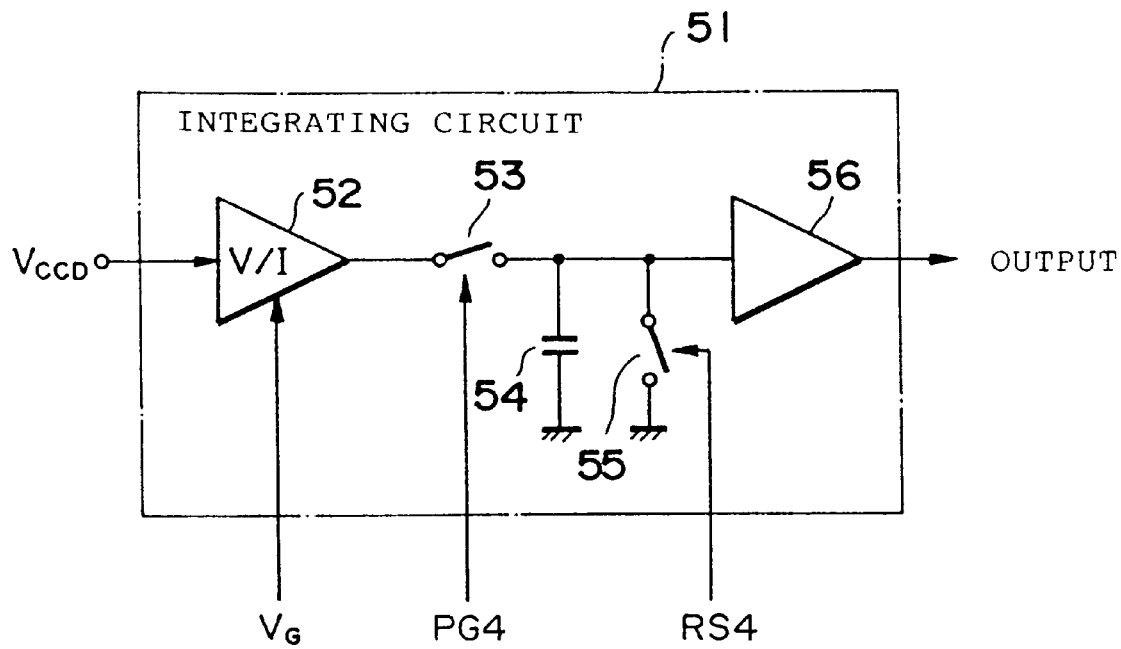
FIG. 9 is a circuit diagram showing the construction of an integrating circuit.
Figure 10:
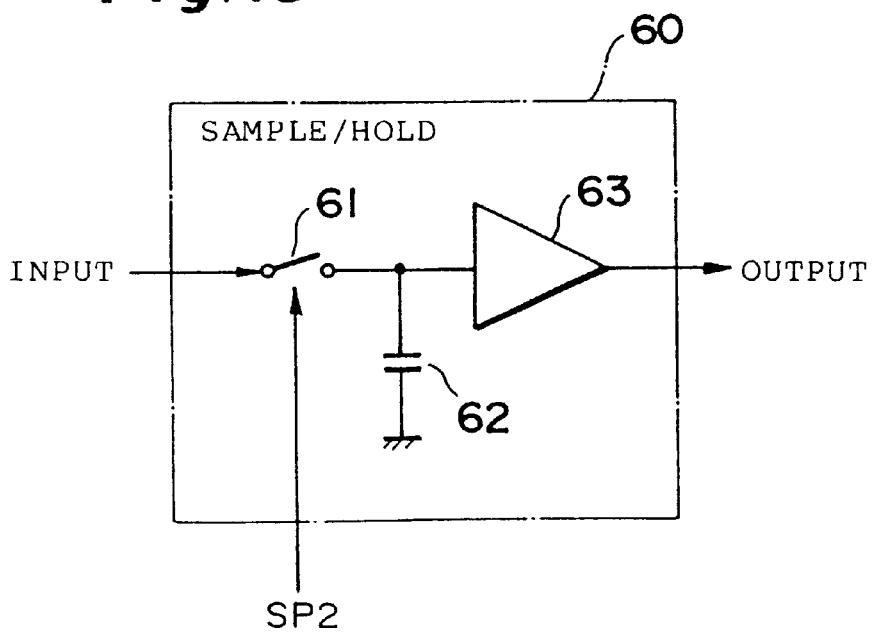
FIG. 10 is a circuit diagram showing the construction of sample-and-hold circuit.
Figure 11:
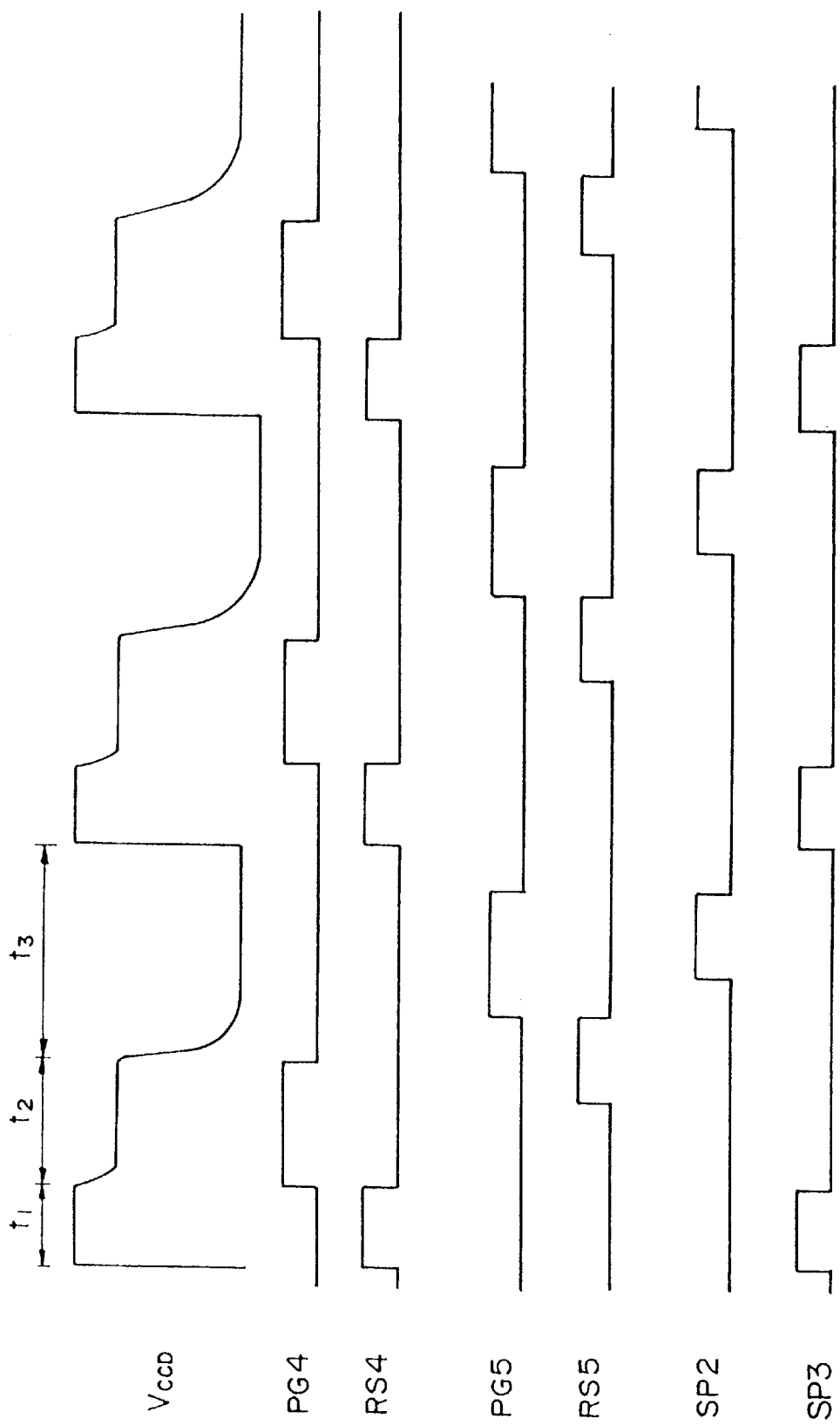
FIG. 11 is a time chart illustrating signals which flow into various circuits contained in the CCD signal readout apparatus of FIG. 8.

FIG. 8, which illustrates another embodiment of the present invention, is a block diagram showing the electrical configuration of a CCD signal readout apparatus. Components in FIG. 8 that are identical with those shown in FIG. 1 are designated by like reference characters and need not be described again. FIGS. 9 and 10 illustrate specific circuit arrangements of integrating circuits and sample-and-hold circuits included in the CCD signal readout apparatus depicted in FIG. 8. FIG. 11 is a time chart representing signals that flow into the various circuits of the CCD signal readout apparatus shown in FIG. 8.

Whereas the CCD signal readout apparatus shown in FIG. 1 or FIG. 6 performs integration upon extracting a feed-through signal component and a video signal component from the captured-image signal outputted by the CCD, the CCD signal readout apparatus of FIG. 8 controls the duration of integration, thereby performing integration of the feed-through signal and video signal without extracting the feed-through signal and video signal in advance. As shown in FIG. 8, the CCD signal readout apparatus includes a first integrating circuit 51 and a second integrating circuit 52. As shown also in FIG. 11, a gate pulse PG4 for controlling the duration of integration in such a manner that the captured-image signal will be integrated over the duration of the feed-through signal time period $t_2$ is applied to the first integrating circuit 51. Further, a reset pulse RS4 for resetting the first integrating circuit 51 is applied to the first integrating circuit 51 immediately before integration starts. A gate pulse PG5 for controlling the duration of integration in such a manner that the captured-image signal will be integrated over the duration of the video signal time period $t_3$ is applied to the second integrating circuit 52. A reset pulse RS5 for resetting the second integrating circuit 52 is applied to the second integrating circuit 52 immediately before integration starts. A control voltage VG is applied to the first integrating circuit 51 and second integrating circuit 52 in such a manner that their integration coefficients will be the same. The first and second integrating circuits 51 and 52 perform integration in accordance with integration coefficients controlled by the control voltage VG.

The captured-image signal VCCD outputted by the amplifier circuit 11 is applied to the first and second integrating circuits 51 and 52. The first integrating circuit 51 integrates the signal for the duration of the feed-through signal time period $t_2$ and outputs the integrated signal. The signal thus obtained by integration in the first integrating circuit 51 is applied to a sample-and-hold circuit 60. The second integrating circuit 52 integrates the signal $V_{CCD}$ for the duration of the video signal time period $t_3$ and outputs the integrated signal. The signal thus obtained by integration in the second integrating circuit 52 is applied to a sample-and-hold circuit 65.

A sampling pulse SP2 is applied to the sample-and-hold circuit 60, as a result of which the peak value of the integrated signal output from the first integrating circuit 51 applied to the sample-and-hold circuit 60 is held. The signal representing the peak value held in the sample-and-hold circuit 60 is applied to and held in a sample-and-hold circuit 64, which is the next stage. The output of the sample-and-hold circuit 64 is applied to the positive input terminal of a differential amplifier circuit 70.

A sampling pulse SP3 is applied to the sample-and-hold circuit 65, as a result of which the peak value of the integrated signal output from the second integrating circuit 52 is held. The signal representing the peak value held in the sample-and-hold circuit 65 is applied to the negative input terminal of the differential amplifier circuit 70.

The differential amplifier circuit 70 detects and outputs a signal representing the difference between the integrated value of the feed-through signal and the integrated value of the video signal.

As shown in FIG. 9, the captured-image signal $V_{CCD}$ outputted by the CCD 10 is applied to a voltage/current converting circuit 52, to which the control voltage VG stipulating the conversion ratio from voltage to current is applied. The captured-image signal $V_{CCD}$ is converted to current in accordance with the control voltage VG and is then outputted. A gate switch 53 is connected to the output side of the voltage/current converting circuit 52. The gate pulse PG4, which is turned on for the duration of the feed-through signal time period $t_2$, is applied to the gate switch 53. The output current of the voltage/current converting circuit 52 is passed through the gate switch 53 to charge a capacitor 54 for the duration of the feed-through signal time period $t_2$. The charging voltage of the capacitor 54 is amplified in an amplifier circuit 56 and then outputted. The capacitor 54 is discharged by closing the reset switch 55.

The second integrating circuit 52 can be constructed in the same manner as the circuit shown in FIG. 9.

As shown in FIG. 10, the sample-and-hold circuit 60 includes a sampling switch 61. Applying the sampling pulse SP2 turns the sampling switch 61 on, whereby the signal that enters the sample-and-hold circuit 60 charges a capacitor 62. The charging voltage of the capacitor 62 is amplified in an amplifier circuit 63 and then outputted.

The sample-and-hold circuits 64 and 65 also can be constructed in the same manner as the circuit shown in FIG. 10.

Separate integrating circuits are used in the CCD signal readout signal of FIG. 8 to integrate the feed-through signal and the video signal. However, an arrangement can be adopted in which one of the integrating circuits is shared as a voltage/current converting circuit and the output current thereof is introduced to separate gate switches and integrated by separate capacitors.

The CCD signal readout apparatus illustrated in FIG. 8 can also be adapted to accommodate a plurality of color signals, e.g., R, G and B signals, in the same manner as the apparatus shown in FIG. 6. In such case captured-image signals would be extracted for R, G and B and the integrating circuits 51, 52, sample-and-hold circuits 60, 64, 65 and differential amplifier circuit 70 would be provided to correspond to each of the colors R, G and B. The outputs of the differential amplifier circuits thus provided would then be combined.

Figure 12:
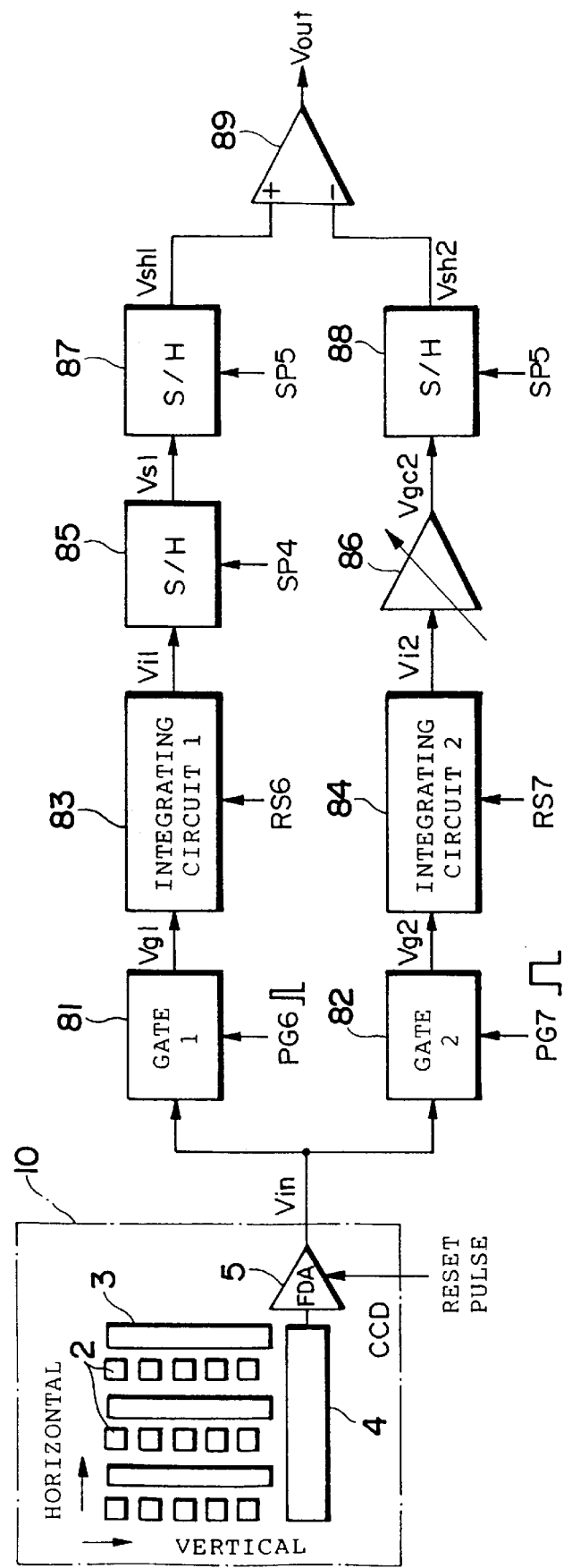
FIG. 12 is a block diagram illustrating the electrical configuration of a CCD signal readout apparatus according to another embodiment of the invention.
Figure 13:
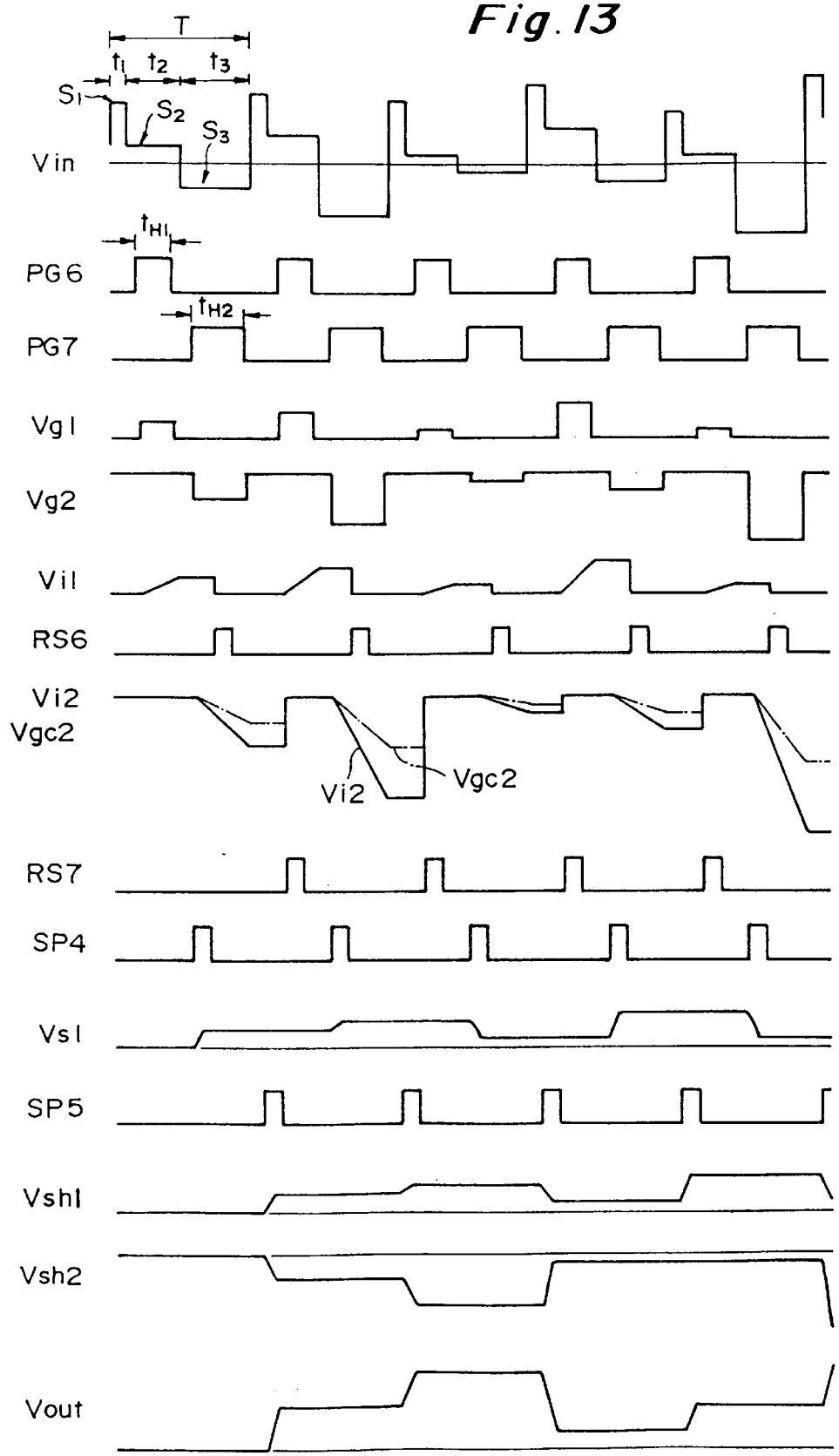
FIG. 13 is a time chart illustrating signals which flow into various circuits contained in the CCD signal readout apparatus of FIG. 12.

FIG. 12, which illustrates another embodiment of the present invention, is a block diagram showing the electrical configuration of a CCD signal readout apparatus. FIG. 13 is a time chart associated with the CCD signal readout apparatus shown in FIG. 12. Components in FIG. 12 that are identical with those shown in FIG. 1 are designated by like reference characters and need not be described again.

The captured-image signal Vin outputted by the CCD 10 is applied to a first gate circuit 81 and a second gate circuit 82. Gate pulses PG6 and PG7 are applied to the first gate circuit 81 and second gate circuit 82, respectively. The first gate circuit 81 and second gate circuit 82 pass and output the captured-image signal Vin, which is provided by the CCD 10, for periods of time during which the gate pulses PG6 and PG7 are at the H level. The gate pulse PG6 applied to the first gate circuit 81 attains the H level within the time period $t_2$ over which the feed-through signal component of the captured-image signal Vin enters the first gate circuit 81. Accordingly, the output signal of the first gate circuit 81 is a signal having the level of the feed-through signal component. The gate pulse PG7 applied to the second gate circuit 82 attains the H level within the time period $t_3$ over which the video signal component of the captured-image signal Vin enters the second gate circuit 82. Accordingly, the output signal of the second gate circuit 82 is a signal having the level of the video signal component.

The duration $t_{H1}$ of the H level of gate pulse PG6 applied to the first gate circuit 81 and the duration $t_{H2}$ of the H level of gate pulse PG7 applied to the second gate circuit 82 differ. Since the time period $t_3$ of the video signal is longer than the time period $t_2$ of the feed-through signal in the example illustrated in FIG. 13, the duration $t_{H2}$ of the H level of gate pulse PG7 is set to be longer than the duration $t_{H1}$ of the H level of gate pulse PG6 in accordance with the time periods $t_2$ and $t_3$.

The output signal of the first gate circuit 81 is applied to a first integrating circuit 83 as a first extracted captured-image signal Vg1. The output signal of the second gate circuit 82 is applied to a second integrating circuit 84 as a second extracted captured-image signal Vg2. The first extracted captured-image signal Vg1 and second extracted captured-image signal Vg2 fed into the first integrating circuit 83 and second integrating circuit 84, respectively, are integrated by these integrating circuits 83, 84 during the time that reset signals RS6 and RS7 are being applied.

A signal Vi1 representing the integrated value obtained by integration in the first integrating circuit 83 is applied to a sample-and-hold circuit 85. A sampling pulse SP4, which attains the H level for a period of time over which the signal representing the input integrated value peaks, is applied to the sample-and-hold circuit 85. The peak value of the signal representing the input integrated value is sampled in the sample-and-hold circuit 85, which outputs a signal Vs1 representing the peak value. The signal Vs1 representing the peak value is applied to a sample-and-hold circuit 87, which is the next stage. In order to obtain a signal representing the difference between a signal representing the integrated value of the captured-image signal extracted from the feed-through signal and the signal representing the integrated value of the captured-image signal extracted from the video signal, the sample-and-hold circuit 87 delays the signal representing the integrated value of the captured-image signal extracted from the feed-through signal. An integrated signal Vsh1 outputted by the sample-and-hold circuit 87 is applied to the positive input terminal of a differential amplifier circuit 89.

A signal Vi2 representing the integrated value obtained by integration in the second integrating circuit 84 is applied to a gain adjusting amplifier circuit 86. The period $t_{H1}$ over which the feed-through signal is extracted and the period $t_{H2}$ over which the video signal is extracted differ in the CCD signal readout apparatus according to this embodiment. Consequently, in a case where the difference between an integrated value of a signal obtained be extracting part of the feed-through signal and the integrated value of a signal obtained by extracting part of the video signal has been calculated, the signal representing this difference will not be one that accurately corresponds to the level of the video signal. In the CCD signal readout apparatus according to this embodiment, the gain of the signal Vi2 obtained by extracting and integrating part of the video signal is adjusted in dependence upon the ratio of the integration time $t_{H1}$ in the first integrating circuit 83 to the integration time $t_{H2}$ in the second integrating circuit 84, whereby the level of the signal representing the difference between the signal Vi1, which is obtained by integrating the feed-through signal for the duration of part of the feed-through signal, and the signal Vi2, which is obtained by integrating the video signal for the duration of part of the video signal, is accurately adjusted so as to correspond to the video signal level. The gain adjusting amplifier circuit 86 is provided to adjust the level of the signal Vi2 representing the integrated value in such a manner that the level of the signal representing the difference between the signals Vi1 and Vi2 indicative of the integrated values will accurately correspond to the video signal level.

A signal Vgc2, which is the result of the gain adjustment performed by the gain adjusting amplifier circuit 86, is applied to a sample-and-hold circuit 88. The latter, which is provided with a sampling pulse SP5 the same as a sampling pulse SP5 being applied to the sample-and-hold circuit 87, samples the input signal Vgc2 and outputs the same as a signal Vsh2. The signal Vsh2 from the sample-and-hold circuit 88 is applied to the negative input terminal of the difference amplifier circuit 89.

The differential amplifier circuit 89 subtracts the signal Vsh2 outputted by the sample-and-hold circuit 88 from the signal Vsh1 outputted by the sample-and-hold circuit 87 and produces an output signal indicative of the difference. The differential amplifier circuit 89 subtracts the signal representing the integrated value of the video signal within a fixed period of time from the signal representing the integrated value of the feed-through signal within a fixed period of time and outputs a signal Vout representing the difference between these two signals. The signal Vout is free of noise and corresponds to the amount of signal charge that has accumulated in the photodiodes 2 of the CCD 10. The signal Vout is subjected to signal processing such as a color-balance correction and a gamma correction, after which the signal is recorded on a recording medium such as a memory card or magnetic tape.

The time period t2 of the feed-through signal and the time period t3 of the video signal in the CCD signal readout apparatus of this embodiment can each be used effectively so that integration can be performed upon setting any integration time. This makes it possible to remove more noise components.

Figure 14:
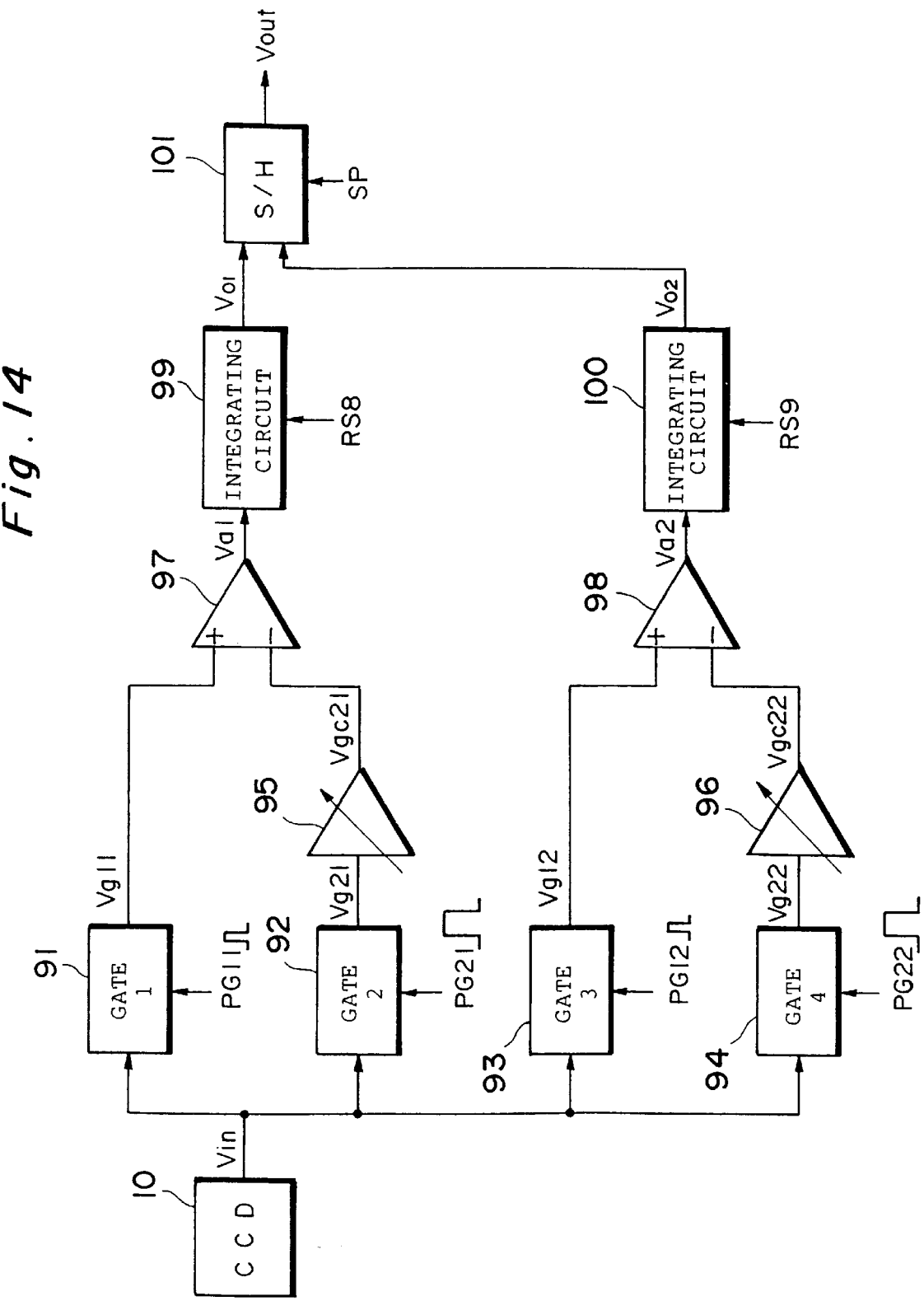
FIG. 14 is a block diagram illustrating the electrical configuration of a CCD signal readout apparatus according to another embodiment of the invention.
Figure 15:
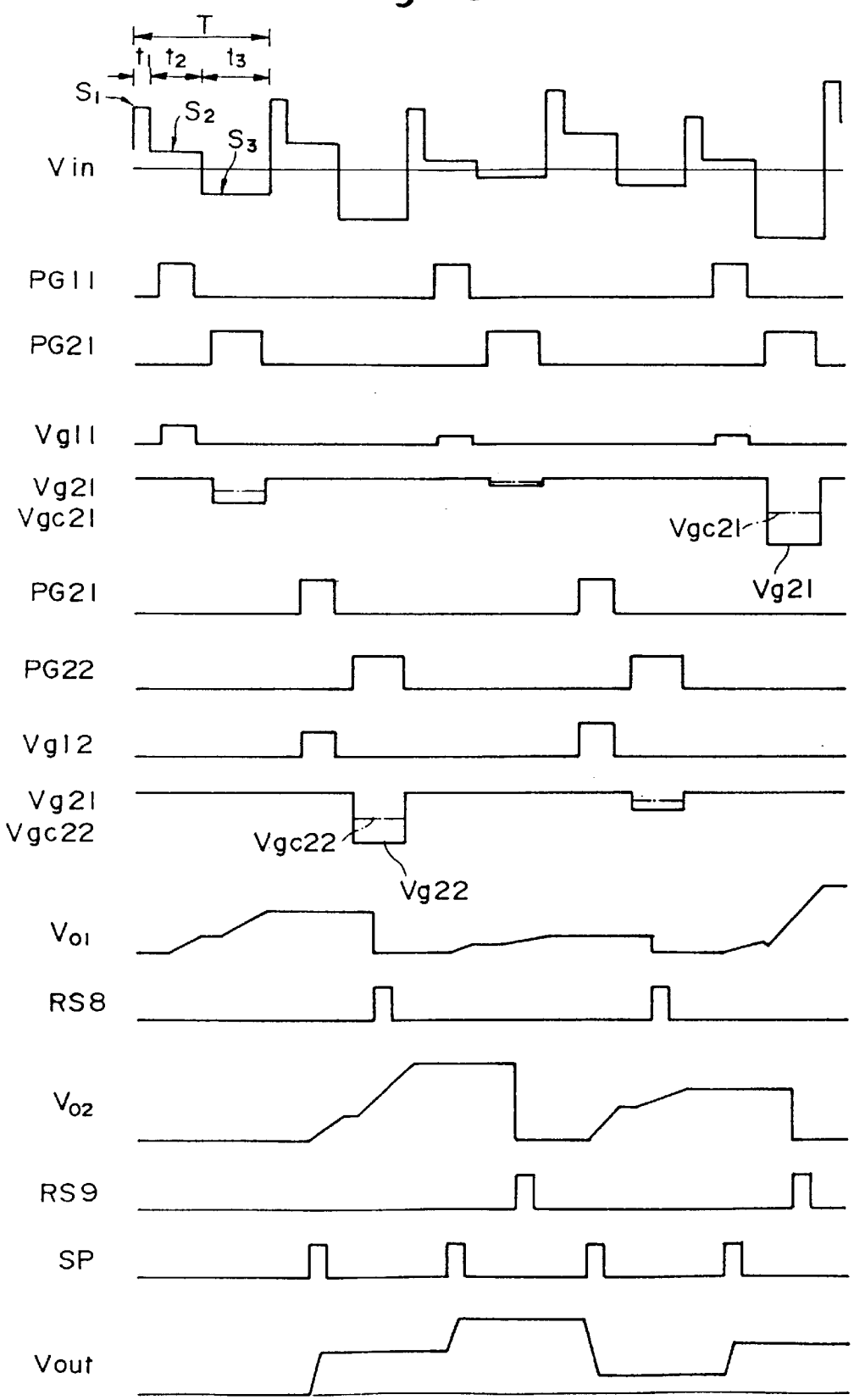
FIG. 15 is a time chart illustrating signals which flow into various circuits contained in the CCD signal readout apparatus of FIG. 14.

FIG. 14, which illustrates another embodiment of the present invention, is a block diagram showing the electrical configuration of a CCD signal readout apparatus. FIG. 15 is a time chart representing signals that flow into the various circuits of the CCD signal readout apparatus shown in FIG. 14.

In the CCD signal readout apparatus shown in FIG. 12, the output signal Vg1 of the first gate circuit 81 and the output signal Vg2 of the second gate circuit 82 are integrated by the first integrating circuit 83 and second integrating circuit 84, respectively, and the difference between these integrated values is calculated. In the CCD signal readout apparatus shown in FIG. 14, however, integration is performed after the calculation of the signal representing the difference between the feed-through signal and video signal that have passed through the gate circuits. Further, in the CCD signal readout apparatus shown in FIG. 14, the gate circuits which extract the feed-through signal and video signal are changed every pixel period T. As a result, it is possible to perform the signal extraction operation and the clearing of the integrating circuits with regard to comparatively high-speed CCD readout signals.

As shown in FIGS. 14 and 15, the captured-image signal outputted by the CCD 10 is applied to a first gate circuit 91, a second gate circuit 92, a third gate circuit 93 and a fourth gate circuit 94. The first and third gate circuits 91 and 93 are circuits for extracting and outputting a signal, which is part of the feed-through signal, from the captured-image signal output of the CCD 10 alternately every other pixel period T. The second and fourth gate circuits 92 and 94 are circuits for extracting and outputting a signal, which is part of the video signal, from the captured-image signal output of the CCD 10 alternately every other pixel period T.

Gate pulses PG11 and PG12, which attain the H level in the feed-through signal time period $t_2$, are applied to the first gate circuit 91 and third gate circuit 93, respectively, alternately every other pixel period T. The first gate circuit 91 and third gate circuit 93 output the captured-image signal Vin for the periods of time over which the applied gate pulses PG11 and PG12 are at the H level. Gate pulses PG21 and PG22, which attain the H level in the video signal time period $t_3$, are applied to the second gate circuit 92 and fourth gate circuit 94, respectively, alternately every other pixel period T. The second gate circuit 92 and fourth gate circuit 94 output the captured-image signal Vin for the periods of time over which the applied gate pulses PG21 and PG22 are at the H level.

The periods of time over which the gate pulses PG11 and PG12 are at the H level are equal to each other, and the periods of time over which the gate pulses PG21 and PG22 are at the H level also are equal to each other. The periods of time over which the gate pulses PG21 and PG22 are at the H level are longer than periods of time over which the gate pulses PG11 and PG12 are at the H level.

Captured-image signals Vg11 and Vg12, which are within the feed-through signal time period $t_2$ and have been passed through the first and third gate circuits 91 and 93, respectively, are applied to positive input terminals of differential amplifier circuits 97 and 98, respectively. Captured-image signals vg21 and Vg22, which are within the video signal time period $t_3$ and have been passed through the second and fourth gate circuits 92 and 94, respectively, are applied to gain adjusting amplifier circuits 95 and 96, respectively. The gain adjusting amplifier circuits 95 and 96 adjust the gain of these signals in dependence upon the ratio of the gate pulses PG11 to the gate pulses PG21 and the ratio of the gate pulses PG12 to the gate pulses PG22, respectively, in such a manner that the integrated values obtained by integrating the signals Vg21 and Vg22 will become equal to the integrated values obtained when the signals Vg21 and Vg22 are integrated for the durations of the gate pulses PG11 and PG12. Signals Vgc21 and Vgc22 obtained by the gain adjustments in the gain adjusting circuits 95 and 96 are applied to negative input terminals of the differential amplifier circuits 97 and 98.

The differential amplifier circuit 97 outputs a signal Va1 obtained by amplifying the difference between the signal Vg11 having the feed-through signal level passed by the gate circuit 91 and the signal Vgc21 of the video signal time period t3 obtained by the gain adjustment in the gain adjusting amplifier circuit 95. The signal Va1 is applied to an integrating circuit 99, where the signal is integrated and then outputted as a signal V01. The integrated signal V01 outputted by the integrating circuit 99 is applied to a sample-and-hold circuit 101.

The differential amplifier circuit 98 outputs a signal Va2 obtained by amplifying the difference between the signal Vg12 having the feed-through signal level passed by the gate circuit 93 and the signal Vgc22 of the video signal time period t3 obtained by the gain adjustment in the gain adjusting amplifier circuit 96. The signal Va2 is applied to an integrating circuit 100, where the signal is integrated and then outputted as a signal V02. The integrated signal V02 outputted by the integrating circuit 100 is applied to the sample-and-hold circuit 101.

A sampling pulse SP having a period equivalent to the pixel period T is applied to the sample-and-hold circuit 101, which proceeds to sample and output the signals V01 and V02 representing the integrated values provided by the integrating circuits 99 and 100, respectively. The output Vout of the sample-and-hold circuit 101 becomes the output of the CCD signal readout apparatus.

The feed-through signal and video signal from the captured-image signal outputted by the CCD 10 can be integrated over any period of time in the CCD signal readout apparatus of FIG. 14 as well.

Low-pass filters may be used as the integrating circuits 83 or 84 or as the integrating circuits 99 and 100 contained in the CCD signal readout apparatus shown in FIG. 12 or FIG. 14.

Figure 16:
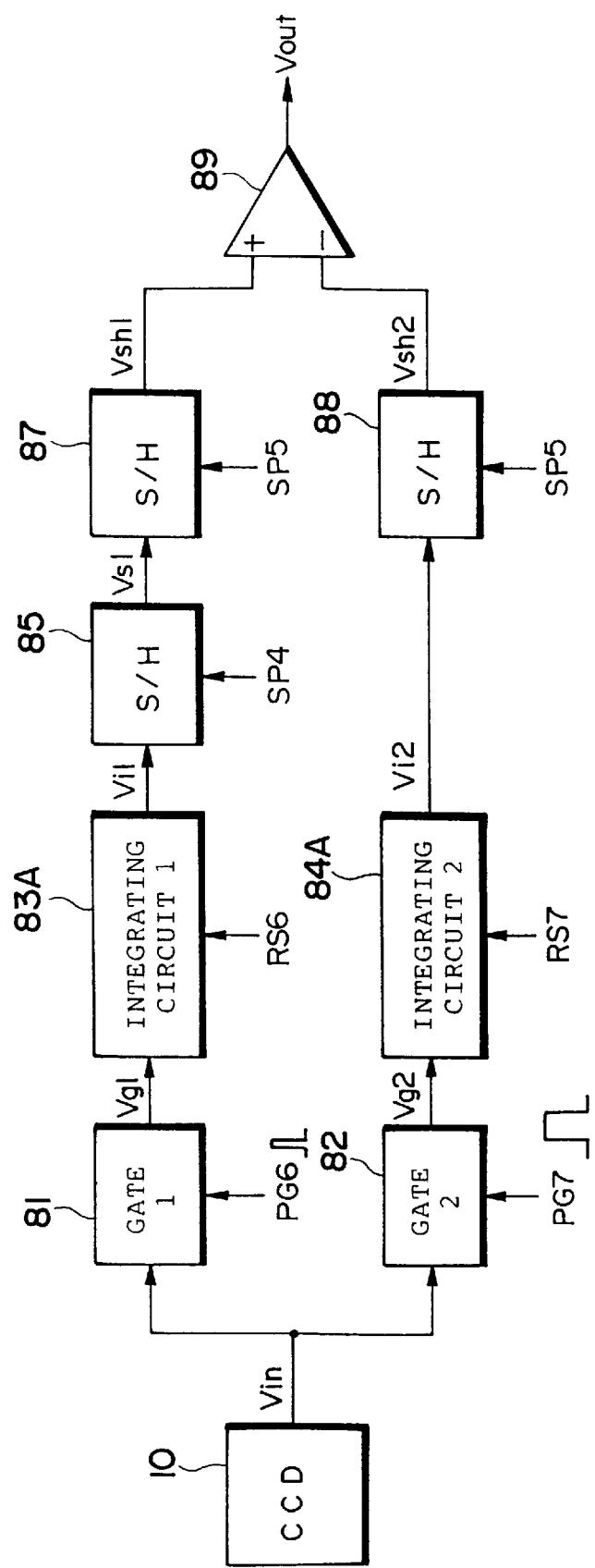
FIG. 16 is a block diagram illustrating the electrical configuration of a CCD signal readout apparatus according to another embodiment of the invention.
Figure 17:
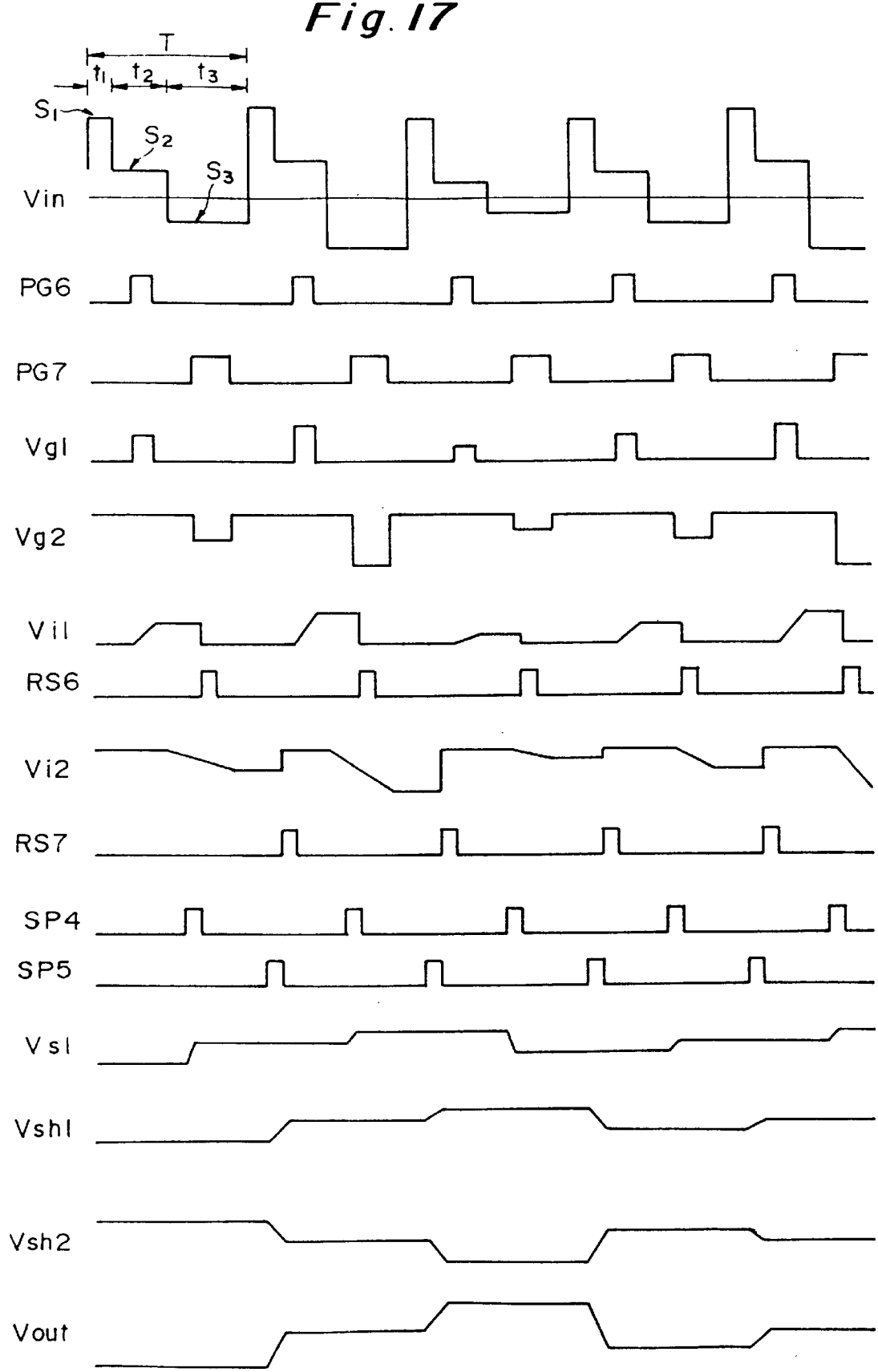
FIG. 17 is a time chart illustrating signals which flow into various circuits contained in the CCD signal readout apparatus of FIG. 16.

FIG. 16, which illustrates another embodiment of the present invention, is a block diagram showing the electrical configuration of a CCD signal readout apparatus. FIG. 17 is a time chart representing signals that flow into the various circuits of the CCD signal readout apparatus shown in FIG. 16. Components in FIG. 16 that are identical with those shown in FIG. 12 are designated by like reference characters and need not be described again.

Whereas the CCD signal readout apparatus shown in FIG. 12 is provided with the gain adjusting amplifier circuit 86 for adjusting the gain of the signal Vi2 outputted by the second integrating circuit 84, the CCD signal readout apparatus shown in FIG. 16 is not provided with the gain adjusting amplifier circuit 86. Here the output signal Vi2 of a second integrating circuit 84A is applied directly to the sample-and-hold circuit 88.

The CCD signal readout apparatus of FIG. 16 is not provided with the gain adjusting amplifier circuit 86.

Therefore, even if the output signals Vg1 and Vg2 of the first gate circuit 81 and second gate circuit 82 are merely integrated and the difference between the integrated values is calculated, the signal representing the difference will not faithfully indicate the level of the video signal. Accordingly, the ratio between the integration coefficients of the first integrating circuit 83A and second integrating circuit 84A contained in the CCD signal readout apparatus of FIG. 16 is set to the ratio between the pulse width of the gate pulse PG6 applied to the first gate circuit 81 and the pulse width of the gate pulse PG7 applied to the second gate circuit 82. As a result, the signal Vi1 representing the integrated value outputted by the first integrating circuit 83A and the signal Vi2 representing the integrated value outputted by the second integrating circuit 84A are proportional to a signal representing an integrated value obtained in a case where the pulse width of the gate pulse PG6 and the pulse width of the gate pulse PG7 are made the same pulse width. Accordingly, when the difference between the signals Vi1 and Vi2 representing the integrated values is calculated in the differential amplifier circuit 89, the signal representing this difference is a signal that corresponds to the video signal level.

The pulse width of the gate pulse PG6 for extracting the feed-through signal and the pulse width of the gate pulse PG7 for extracting the video signal can each be set at will within one pixel period in the CCD signal readout apparatus of FIG. 16 as well.

Figure 18:
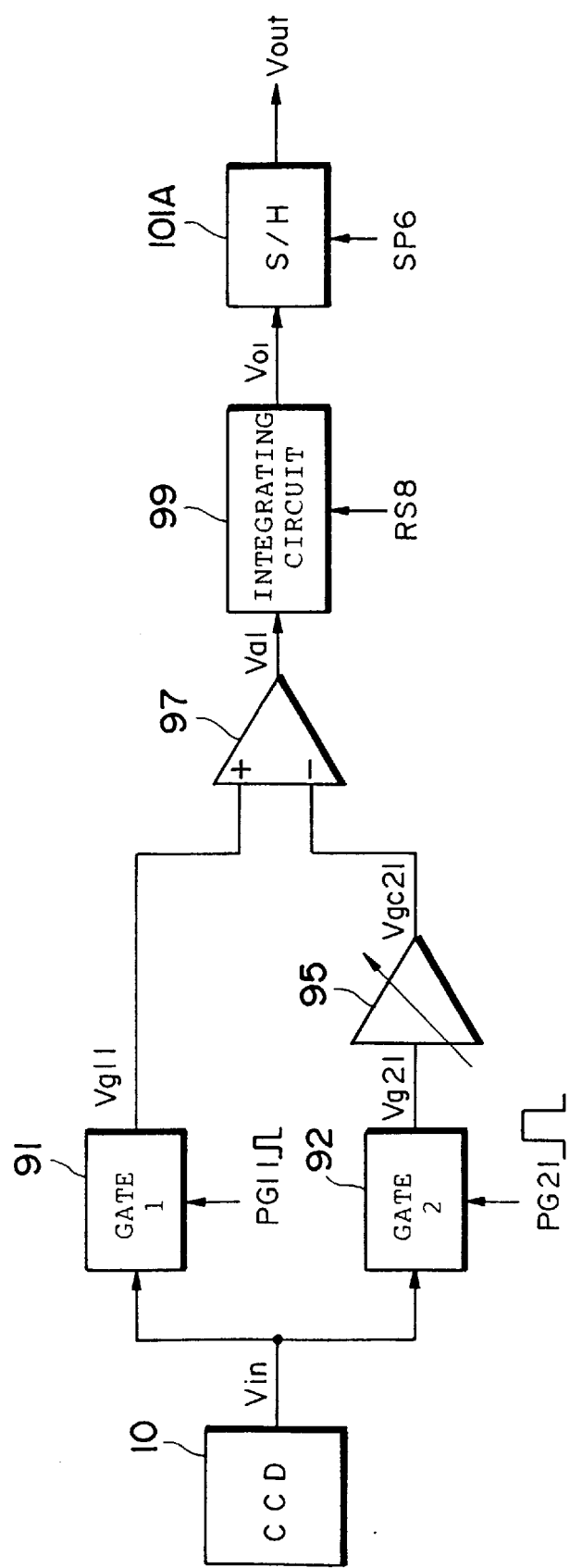
FIG. 18 is a block diagram illustrating the electrical configuration of a CCD signal readout apparatus according to another embodiment of the invention.
Figure 19:
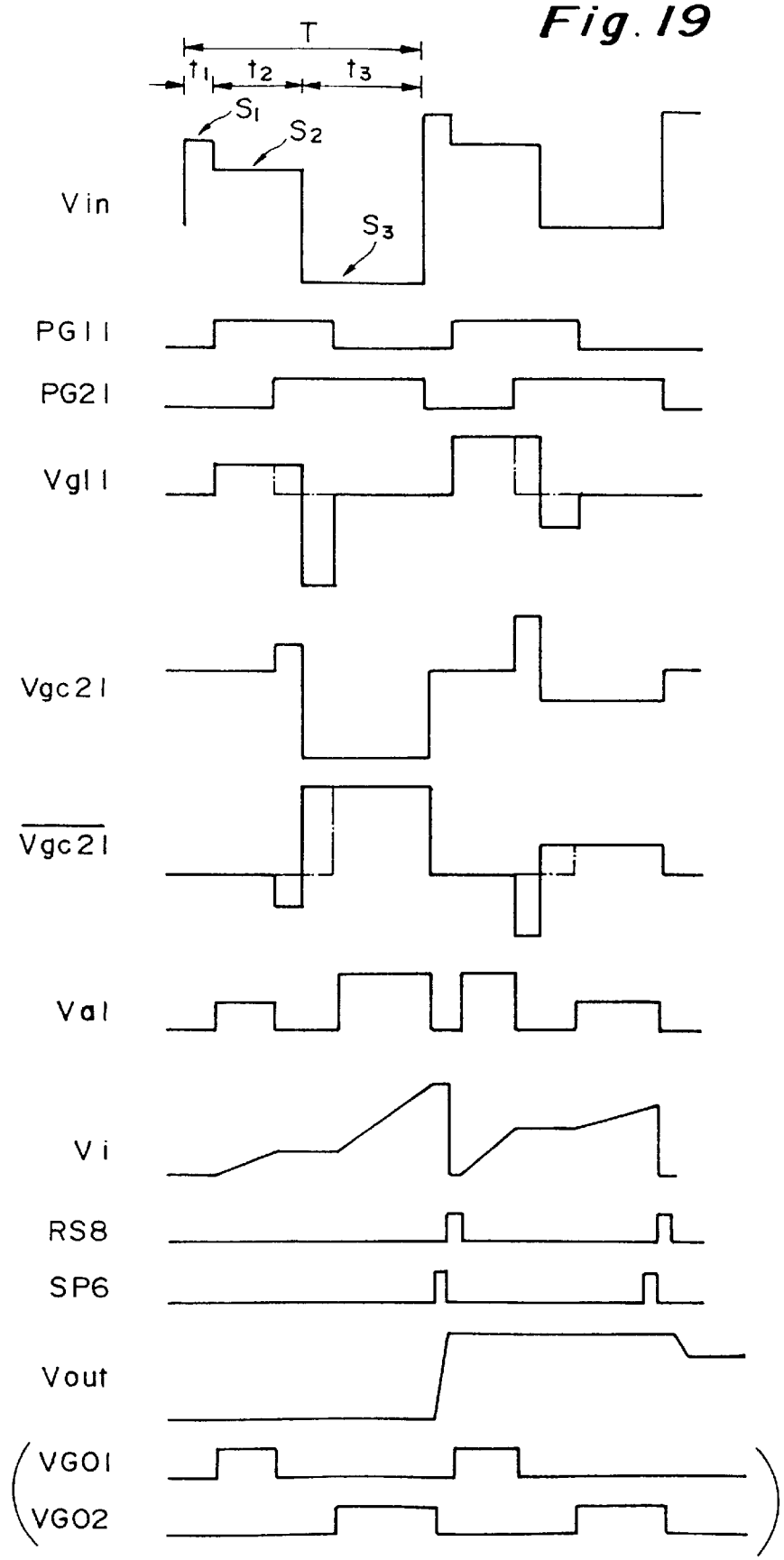
FIG. 19 is a time chart illustrating signals which flow into various circuits contained in the CCD signal readout apparatus of FIG. 18.

FIG. 18, which illustrates another embodiment of the present invention, is a block diagram showing the electrical configuration of a CCD signal readout apparatus. FIG. 19 is a time chart representing signals that flow into the various circuits of the CCD signal readout apparatus shown in FIG. 16. The CCD signal readout apparatus shown in FIG. 18 is obtained by extracting part of the signal readout apparatus illustrated in FIG. 14. Components in FIG. 18 that are identical with those shown in FIG. 14 are designated by like reference characters and need not be described again.

In the CCD signal readout apparatus shown in FIG. 14, the gate pulse PG11 applied to the first gate circuit 91 attains the H level solely within the time period $t_2$ of the feed-through signal, and the gate pulse PG21 applied to the second gate circuit 92 attains the H level solely within the time period $t_3$ of the video signal. By contrast, in the CCD signal readout apparatus shown in FIG. 18, the gate pulse PG11 attains the H level for a length of time that exceeds the time period $t_2$ of the feed-through signal and extends into part of the time period $t_3$ of the video signal, and the gate pulse PG21 attains the H level for a length of time that exceeds the time period $t_3$ of the feed-through signal and extends into part of the time period $t_2$ of the feed-through signal, as shown in FIG. 19. Thus, the H-level durations of the gate pulses PG11 and PG21 need not fall within the time period $t_2$ of the feed-through signal and the time period $t_3$ of the video signal.

When the difference between the signals Vg11 and Vg21 is calculated in the differential amplifier circuit 97, the signal Vg11 extracted by the gate pulse PG11 that extends into the video signal time period $t_3$ and the signal Vg21 extracted by the gate pulse PG21 that extends into the time period $t_2$ of the feed-through signal are canceled in the time periods $t_3$ and $t_2$ into which the gate pulses extend, as depicted in FIG. 19. Accordingly, this is the same as a case where gate pulses VG01 and VG02 would be applied to the first gate circuit 91 and second gate circuit 92, respectively, as shown in FIG. 19.

A low-pass filter may be used instead of the integrating circuit 99 in the CCD signal readout apparatus of FIG. 18 as well.

The manner in which random noise in the captured-image signal outputted by the CCD is reduced by the embodiments of FIGS. 12 through 19 will now be described.

FIG. 20 is a time chart of the captured-image signal outputted by the CCD and of the gate pulses PG6 which extract the feed-through signal and the gate pulses PG7 which extract the video signal. FIG. 20 illustrates a case where the gate pulses PG6 and PG7 have the same pulse width, a case where the pulse width $t_D$ of the gate pulses PG7 it twice that of the gate pulses PG6, and a case where the gate pulses PG6 and PG7 possess the entirety of the effective duration of the feed-through signal time period $t_2$ and the video signal time period $t_3$.

FIG. 21a illustrates random noise in the captured-image signal outputted by the CCD, and FIG. 21b shows random noise in a captured-image signal that has been subjected to correlated double-sampling processing. (In actuality, all high-frequency noise is reflected back at a frequency which is half the sampling frequency. (fx=1/T) i.e., at a frequency of fs/2. Here, however, noise is expressed without being reflected back.)

Figure 22:
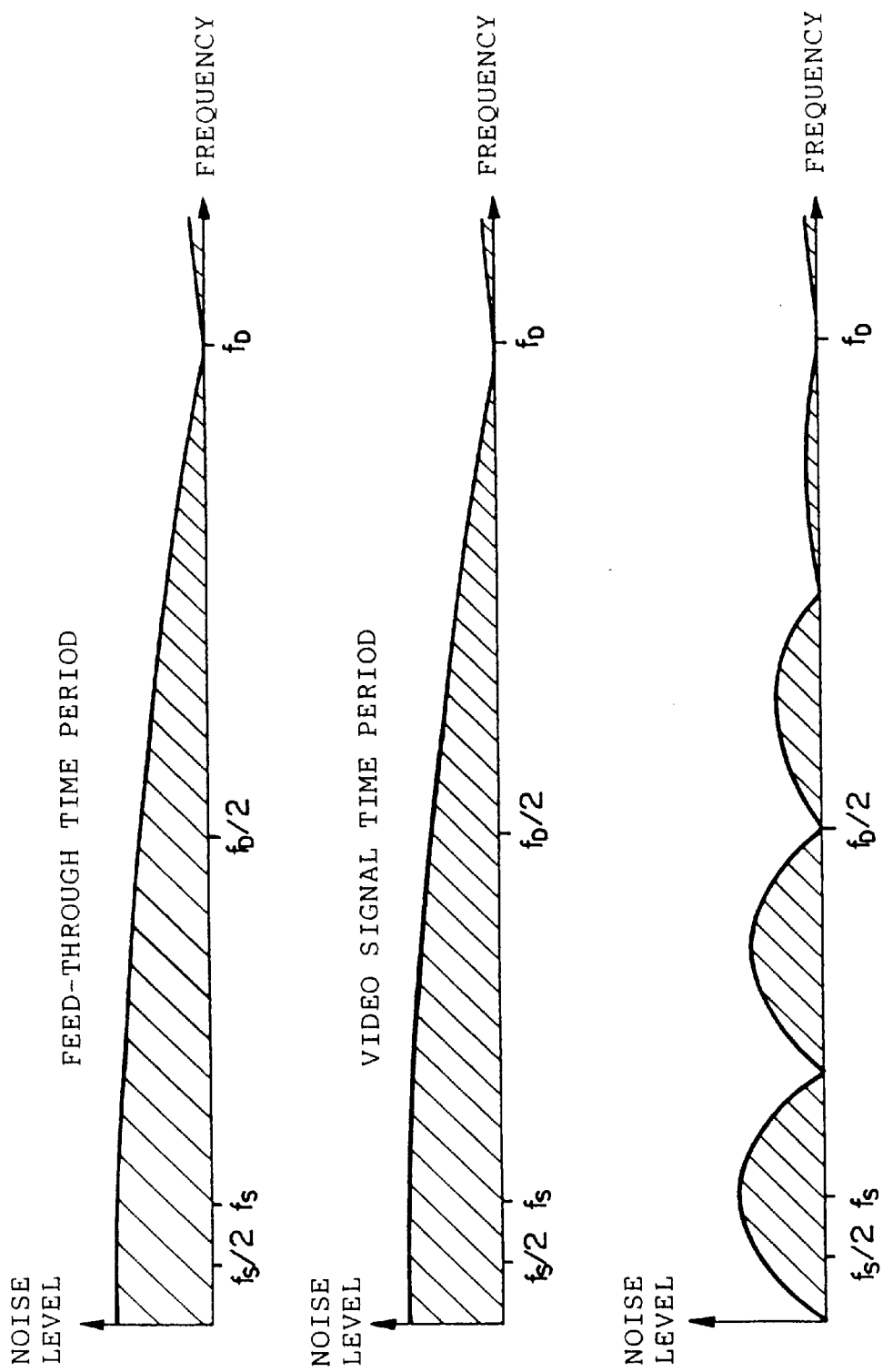
FIG. 22 illustrates the manner in which random noise of a video signal is reduced by correlated double-sampling processing that utilizes integration.

FIG. 22 illustrates random noise in a case where the feed-through signal and video signal have been extracted using gate pulses PG6 and PG7 having the same pulse width, as depicted in FIG. 20. The curve at the top of FIG. 22 is random noise in the feed-through signal, that in the center is random noise in the video signal, and that at the bottom is random noise in the output signal of the CCD signal readout apparatus in a case where the feed-through signal and video signal extracted over the periods of time that the gate pulses PG6 and PG7 are at the H level are integrated and the difference between the integrated values is obtained. $f_D$ is an inverse number of gate pulse width $t_D$, and $f_D$ is equal to $1/t_D$. A comparison with FIG. 21b reveals that random noise of high-frequency components is reduced.

Figure 23:
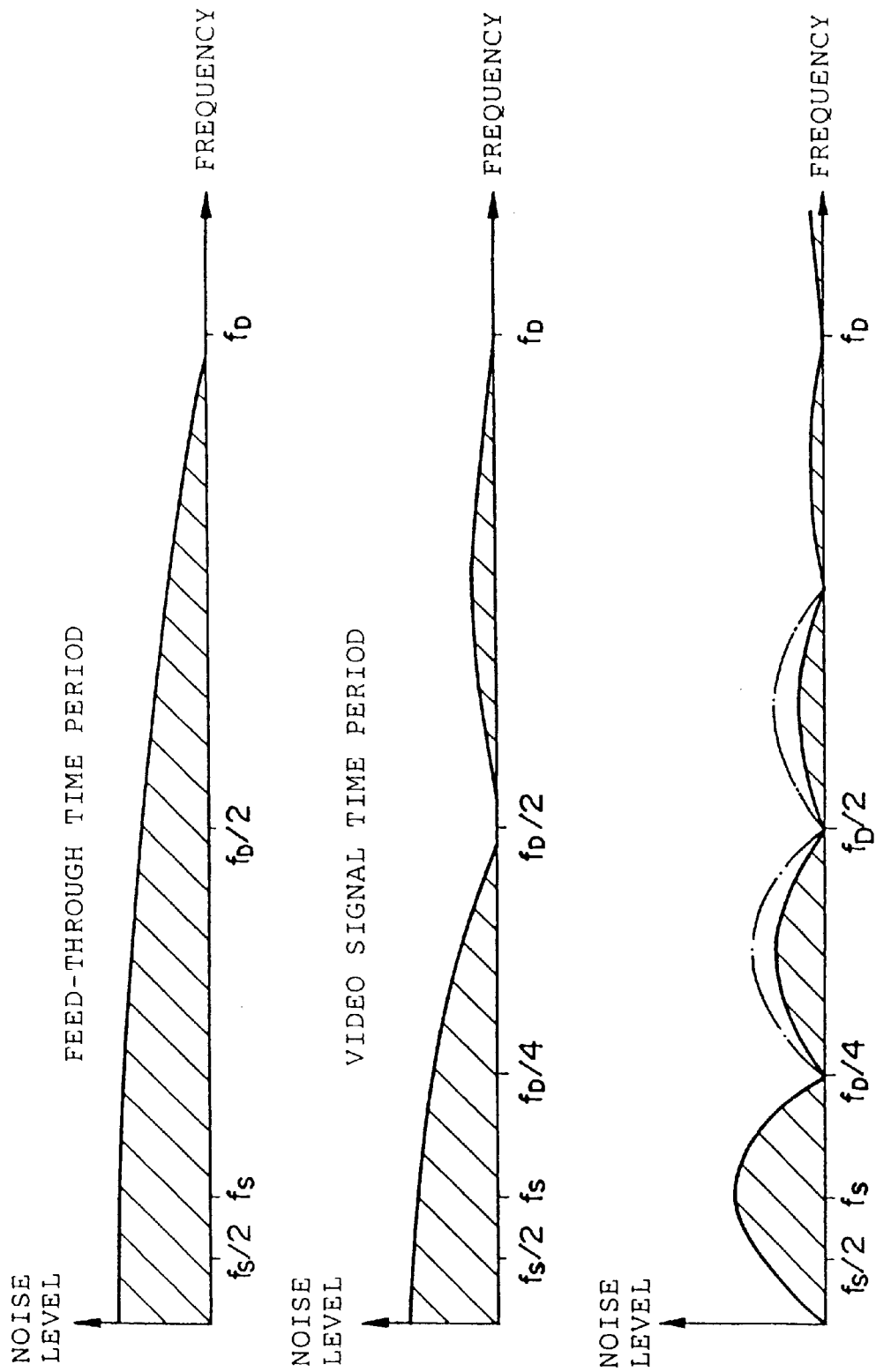
FIG. 23 illustrates the manner in which random noise of a video signal is reduced by correlated double-sampling processing that utilizes integration.

FIG. 23 illustrates random noise in a case where the feed-through signal and video signal have been extracted using gate pulses PG6 and PG7, in which the pulse width of the gate pulses PG7 is twice that of the gate pulses PG6, as shown in FIG. 20. The curve at the top of FIG. 23 is random noise in the extracted feed-through signal, that in the center is random noise in the extracted video signal, and that at the bottom is random noise in the output signal of the CCD signal readout apparatus in a case where the feed-through signal and video signal extracted over the periods of time that the gate pulses PG6 and PG7 are at the H level are integrated and the difference between the integrated values is obtained. A comparison with the random noise shown at the bottom of FIG. 22 reveals that random noise in the output signal of the CCD signal readout apparatus is reduced in FIG. 23 by extracting the video signal upon making the pulse width of the gate pulses PG7 twice that of the gate pulses PG6. (The broken line in FIG. 23 corresponds to the random noise shown at the bottom of FIG. 22.)

Figure 24:
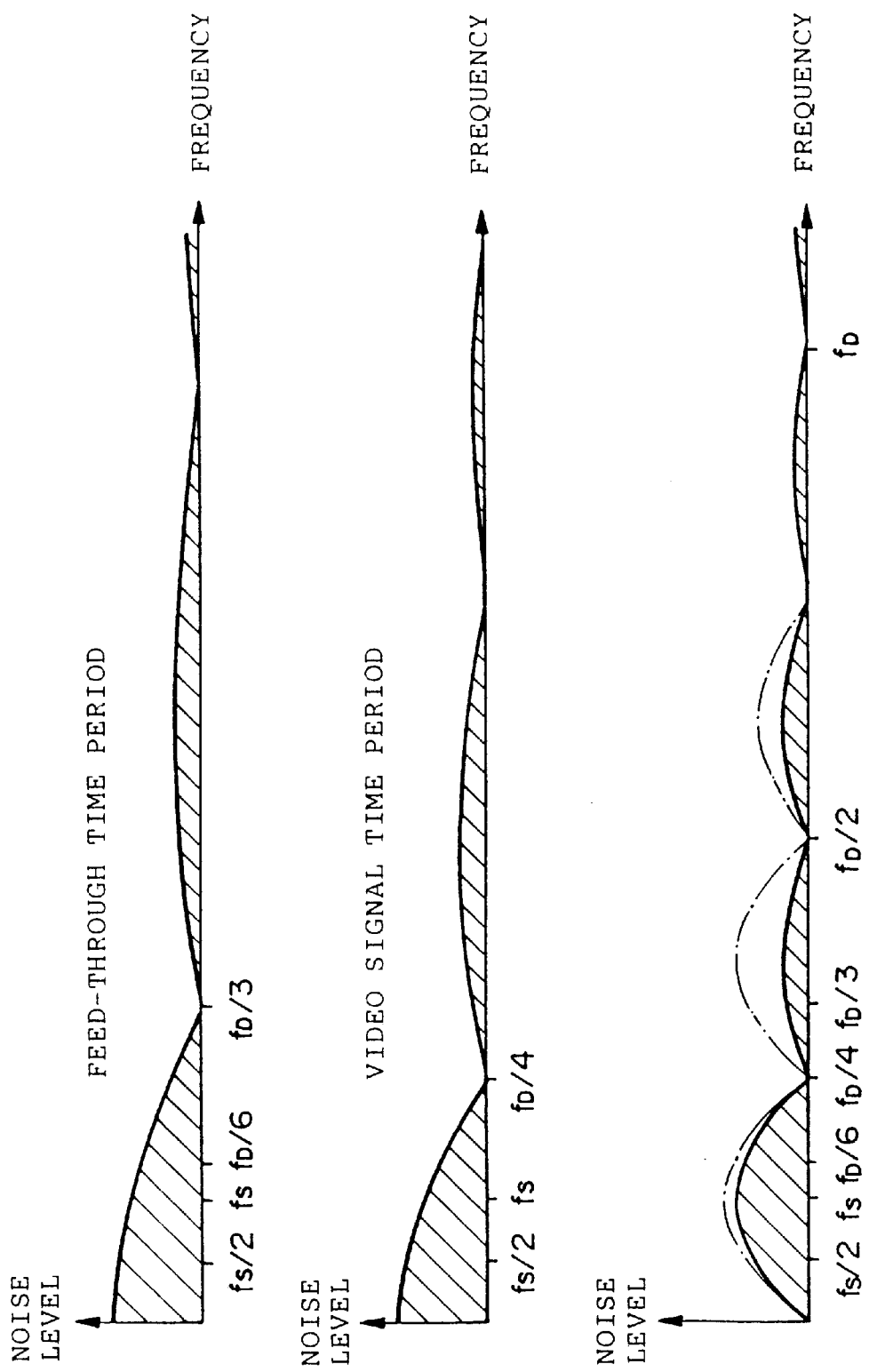
FIG. 24 illustrates the manner in which random noise of a video signal is reduced by correlated double-sampling processing that utilizes integration.
Figure 25:
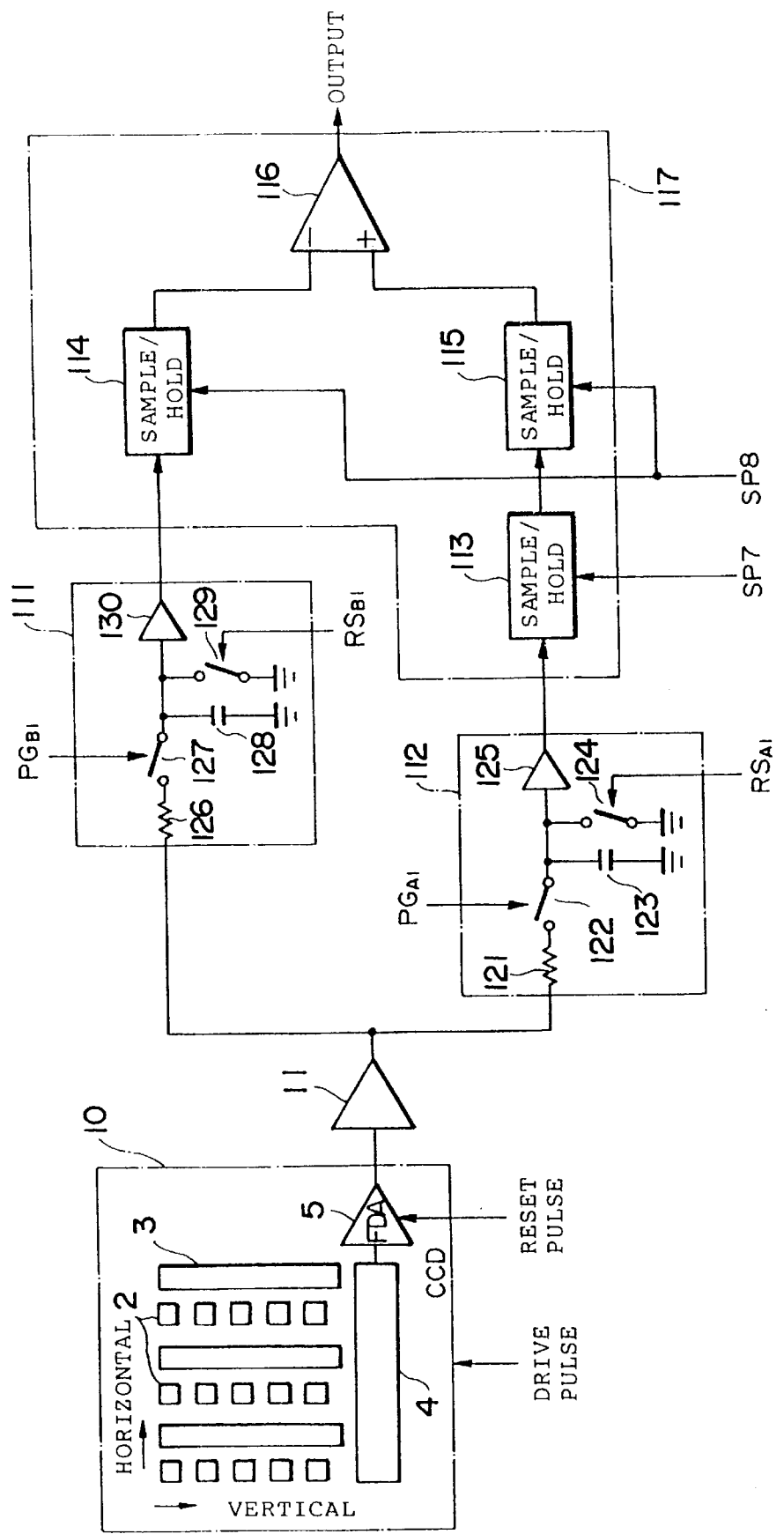
FIG. 25 is a block diagram illustrating the electrical configuration of a CCD signal readout apparatus according to the prior art.
Figure 26:
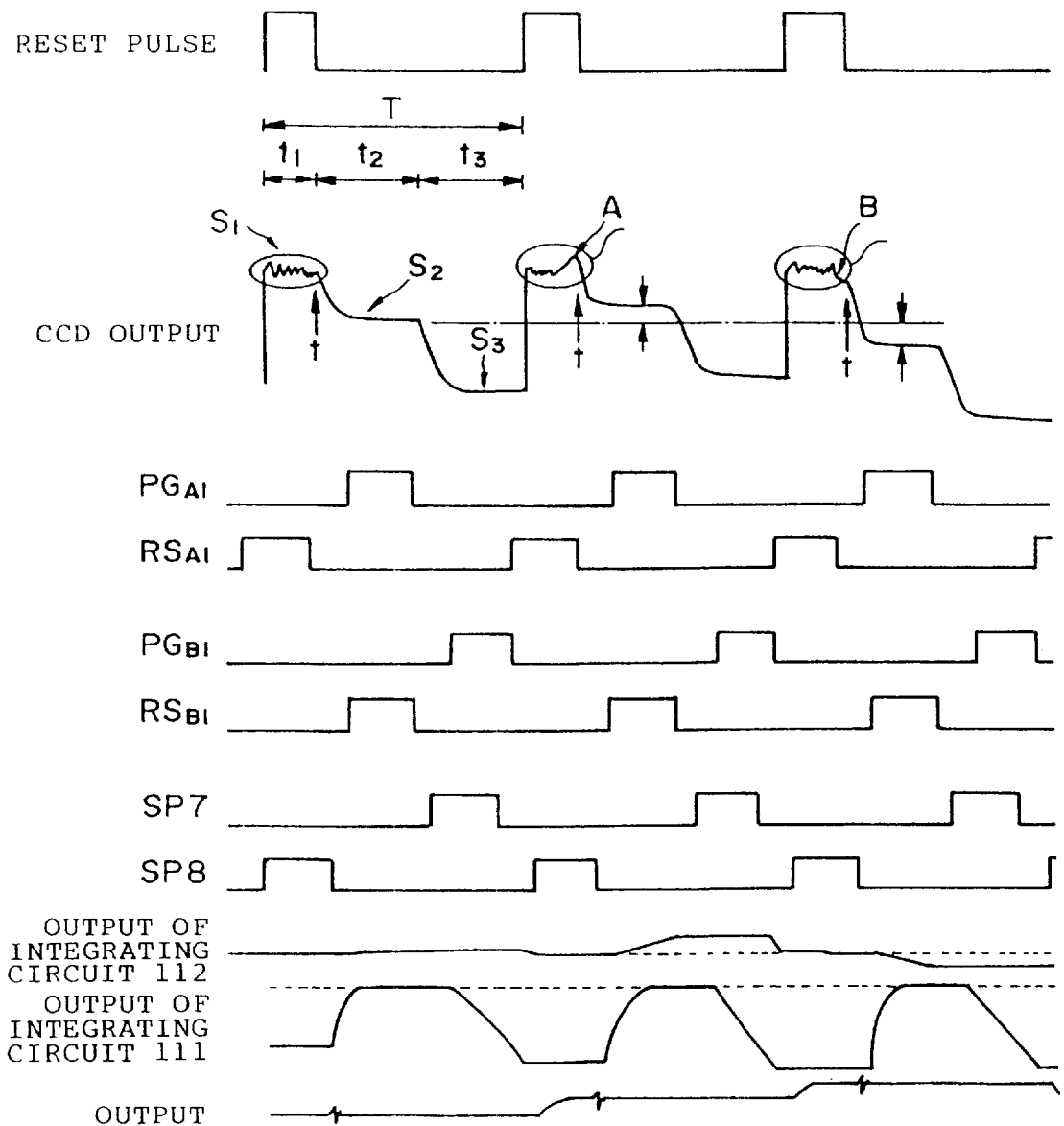
FIG. 26 is a time chart illustrating signals which flow into various circuits contained in the CCD signal readout apparatus of FIG. 25.
Figure 27:
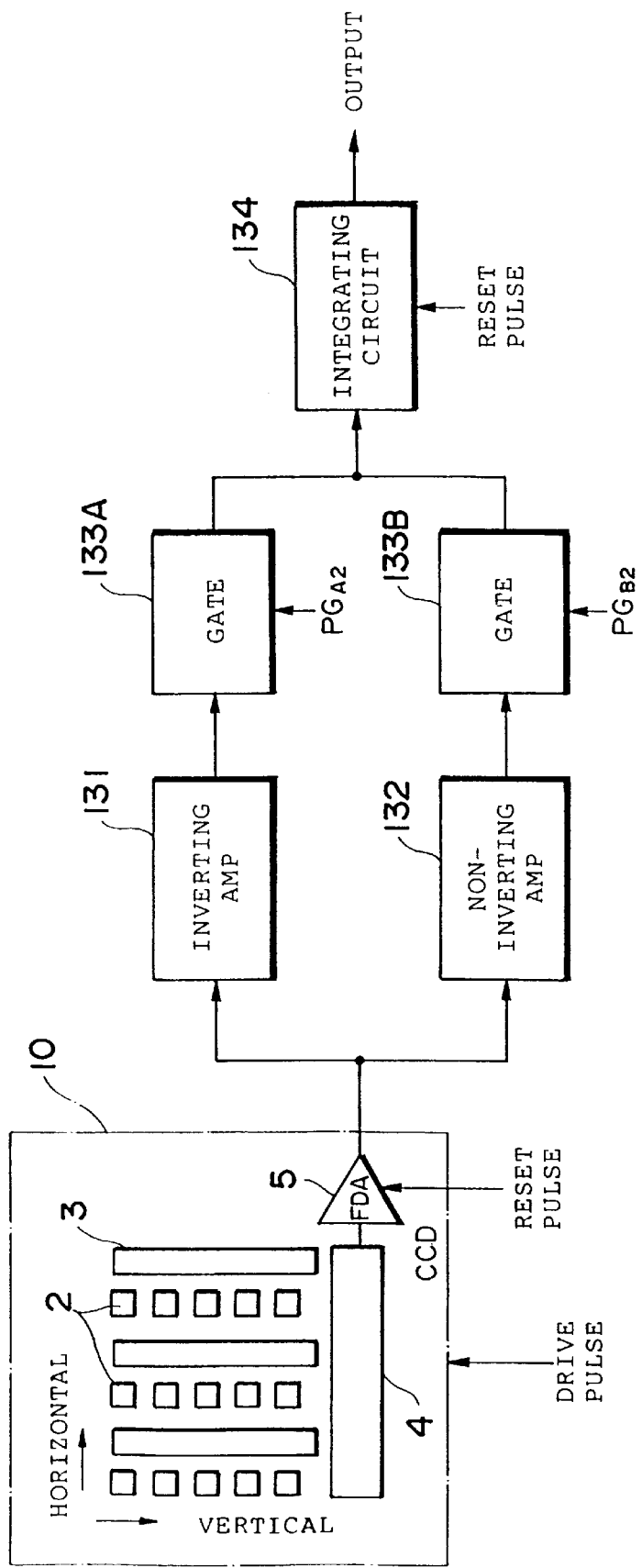
FIG. 27 is a block diagram illustrating the electrical configuration of a CCD signal readout apparatus according to another example of the prior art.
Figure 28:
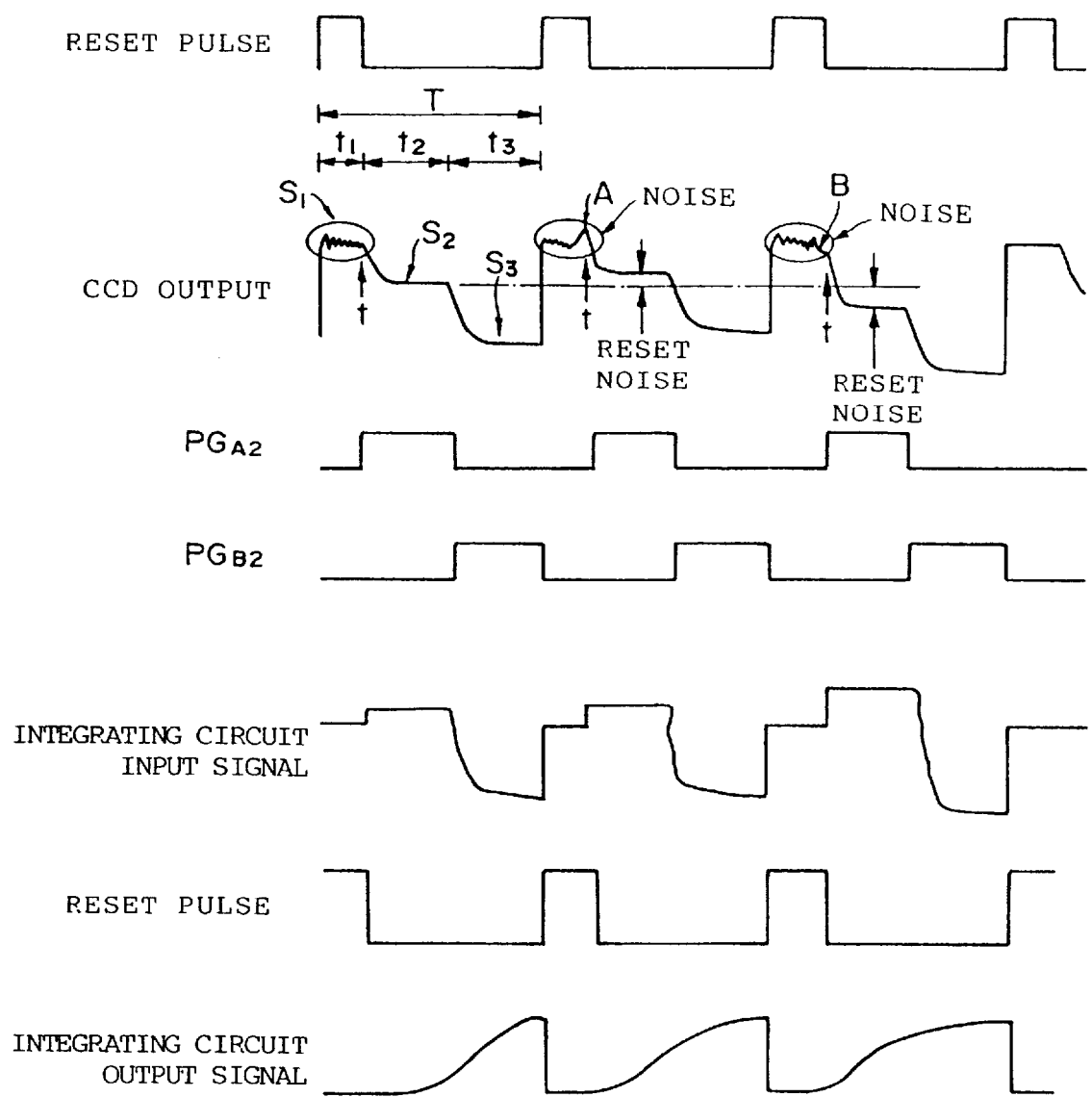
FIG. 28 is a time chart illustrating signals which flow into various circuits contained in the CCD signal readout apparatus of FIG. 27.

FIG. 24 illustrates random noise in a case where the feed-through signal and video signal have been extracted using gate pulses PG6 and PG7, in which the gate pulses PG6 and PG7 possess the entirety of the effective duration of the feed-through signal time period $t_2$ and video signal time period $t_3$, as shown in FIG. 20. The curve at the top of FIG. 23 is random noise in the feed-through signal, that in the center is random noise in the video signal, and that at the bottom is random noise in the output signal of the CCD signal readout apparatus in a case where the feed-through signal and video signal extracted over the periods of time that the gate pulses PG6 and PG7 are at the H level are integrated and the difference between the integrated values is obtained. However, the pulse width of PG6 is assumed to be (3/8)T of the readout period T, and the pulse width of PG2 is assumed to be (1/8)T of the readout period T. A comparison with the random noise shown at the bottom of FIG. 22 reveals that random noise in the output signal of the CCD signal readout apparatus is reduced in FIG. 24 by extracting the feed-through signal and the video signal upon enlarging the pulse widths of the gate pulses PG6 and PG7 (The broken line in FIG. 24 corresponds to the random noise shown at the bottom of FIG. 22.)

Thus, it will be appreciated from FIGS. 23 and 24 that random noise is reduced by enlarging the period over which integration is to be performed.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit over a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising:

a first gate circuit for outputting a signal component, which is outputted by said solid-state image sensing device, as a first extracted captured-image signal for a first period of time that includes the duration of the feed-through signal component;

a second gate circuit for outputting a signal component, which is outputted by said solid-state image sensing device, as a second extracted captured-image signal for a second period of time that is different from the first period of time and includes part of the duration of the video signal component;

a first averaging circuit for averaging the first extracted captured-image signal outputted by said first gate circuit and outputting the averaged signal as a first average captured-image signal;

a second averaging circuit for averaging the second extracted captured-image signal outputted by said second gate circuit and outputting the averaged signal as a second average captured-image signal;

a level adjusting device for adjusting the level of at least one of the first average captured-image signal, which is outputted by said first averaging circuit, and the second average captured-image signal, which is outputted by said second averaging circuit, at the ratio of the first period of time to the second period of time; and a difference signal detecting circuit for detecting and outputting a signal representing a difference between the first average captured-image signal and the second average captured-image signal the signal level of which has been adjusted by said level adjusting device.

2. The apparatus according to claim 1, wherein said first gate circuit extracts a captured-image signal component applied thereto and outputs this signal component as a first captured-image signal for the duration of the feed-through signal; and said second gate circuit extracts a captured-image signal component applied thereto and outputs this signal component as a second captured-image signal for the duration of said captured-image signal component.

3. The apparatus according to claim 1, wherein each of said averaging circuits is an integrating circuit for integrating a signal input thereto or a low-pass filter for eliminating high-frequency components of a signal input thereto.

4. The apparatus according to claim 1, wherein each of said averaging circuits is an integrating circuit for integrating a signal input thereto, and said level adjusting device is capable of changing the level of the input signal by changing an integration coefficient of said integrating circuit.

5. An apparatus for reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit over a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the apparatus comprising:

a first gate circuit for outputting a signal component, which is outputted by said solid-state image sensing device, as a first extracted captured-image signal for a first period of time that includes the duration of the feed-through signal component;

a second gate circuit for outputting a signal component, which is outputted by said solid-state image sensing device, as a second extracted captured-image signal for a second period of time that is different from the first period of time and includes part of the duration of the video signal component;

a level adjusting device for adjusting the level of at least one of the first extracted captured-image signal, which is outputted by said first gate circuit, and the second extracted captured-image signal, which is outputted by said second gate circuit, at the ratio of the first period of time to the second period of time;

a difference signal detecting circuit for detecting and outputting a signal representing a difference between the first extracted captured-image signal outputted by said first gate circuit or the first extracted captured-image signal level-adjusted by said level adjusting device and the second extracted captured-image signal outputted by said second gate circuit or the second extracted captured-image signal level-adjusted by said level adjusting device; and an averaging circuit for averaging and outputting the difference signal outputted by said difference signal detecting circuit.

6. The apparatus according to claim 5, wherein said first gate circuit extracts a captured-image signal component applied thereto and outputs this signal component as a first captured-image signal for the duration of the feed-through signal; and said second gate circuit extracts a captured-image signal component applied thereto and outputs this signal component as a second captured-image signal for the duration of said captured-image signal component.

7. The apparatus according to claim 5, wherein each of said averaging circuits is an integrating circuit for integrating a signal input thereto or a low-pass filter for eliminating high-frequency components of a signal input thereto.

8. The apparatus according to claim 5, wherein each of said averaging circuits is an integrating circuit for integrating a signal input thereto, and said level adjusting device is capable of changing the level of the input signal by changing an integration coefficient of said integrating circuit.

9. A method of reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit over a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the method comprising the steps of:

extracting a signal component, which is outputted by said solid-state image sensing device, as a first extracted captured-image signal for a first period of time that includes the duration of the feed-through signal component;

extracting a signal component, which is outputted by said solid-state image sensing device, as a second extracted captured-image signal for a second period of time that is different from the first period of time and includes part of the duration of the video signal component;

averaging the first extracted captured-image signal and obtaining a first average captured-image signal;

averaging the second extracted captured-image signal and obtaining a second average captured-image signal;

adjusting the level of at least one of the first average captured-image signal and the second average captured-image signal at the ratio of the first period of time to the second period of time; and detecting a signal representing a difference between the first average captured-image signal and the second average captured-image signal the signal level of which has been adjusted.

10. A method of reading a signal out of a solid-state image sensing device which includes a number of photoelectric transducers for storing signal charge in an amount conforming to an amount of irradiating light, and a floating diffusion amplifier circuit for amplifying a video signal component having a level conforming to the amount of signal charge that has accumulated in the photoelectric transducers, and for being reset by a reset pulse applied thereto, wherein a first signal component having a predetermined level is outputted by the floating diffusion amplifier circuit over a period of time during which the reset signal is being applied, a feed-through signal component having a reference level with respect to the video signal component is outputted by the floating diffusion amplifier circuit after the output of the first signal component, and the video signal component following amplification thereof is outputted by the floating diffusion amplifier circuit after output of the feed-through signal component, the method comprising the steps of:

obtaining, through use of a first gate circuit, a signal component, which is outputted by said solid-state image sensing device, as a first extracted captured-image signal for a first period of time that includes the duration of the feed-through signal component;

obtaining, through use of a second gate circuit, a signal component, which is outputted by said solid-state mage sensing device, as a second extracted captured-image signal for a second period of time that is different from the first period of time and includes part of the duration of the video signal component;

adjusting the level of at least one of the first extracted captured-image signal, which is outputted by said first gate circuit, and the second extracted captured-image signal, which is outputted by said second gate circuit, at the ratio of the first period of time to the second period of time;

obtaining a signal representing a difference between the first extracted captured-image signal outputted by said first gate circuit or the level-adjusted first extracted captured-image signal and the second extracted captured-image signal outputted by said second gate circuit or the level-adjusted second extracted captured-image signal; and averaging the difference signal.

\* \* \* \* \*